Figure 1A:
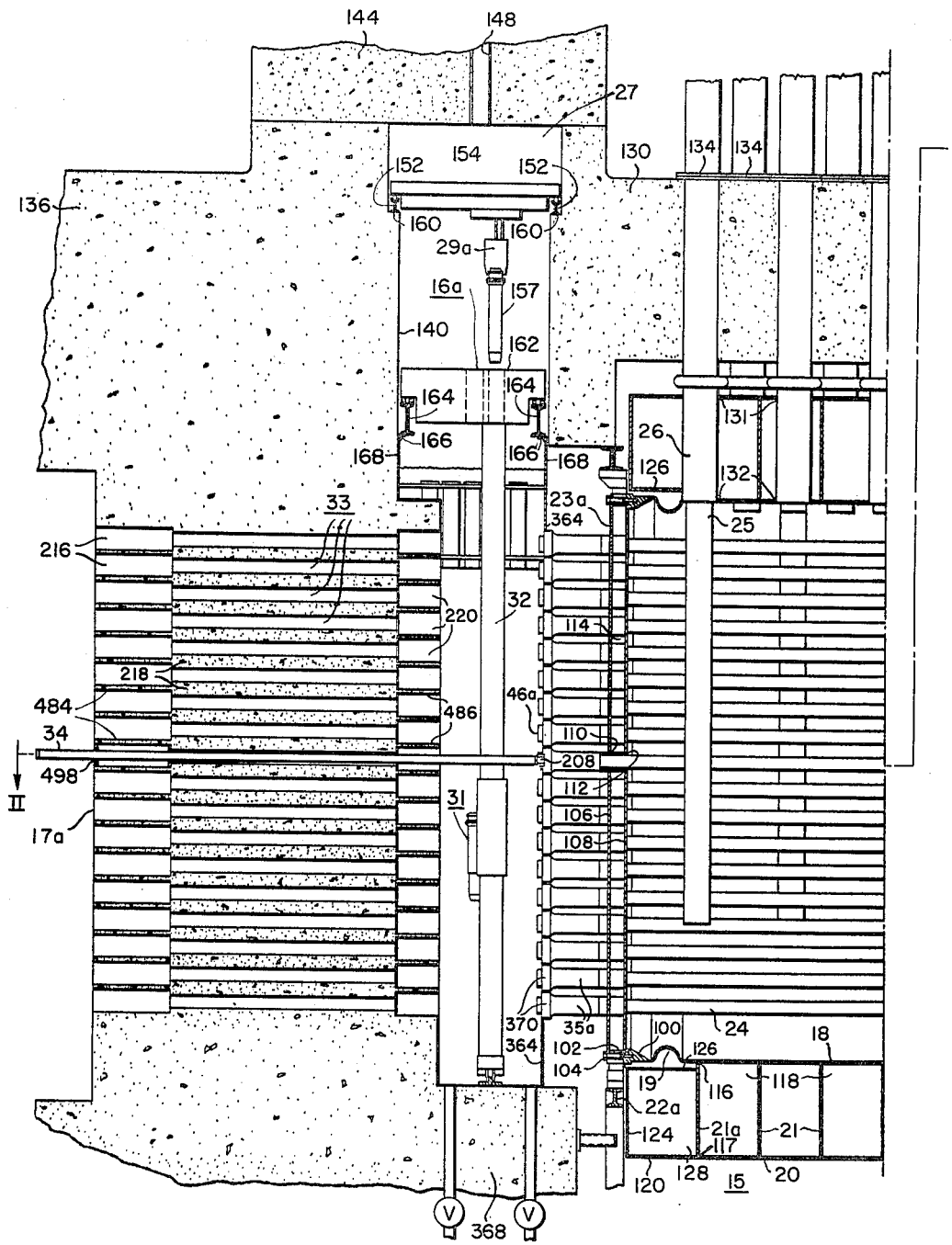

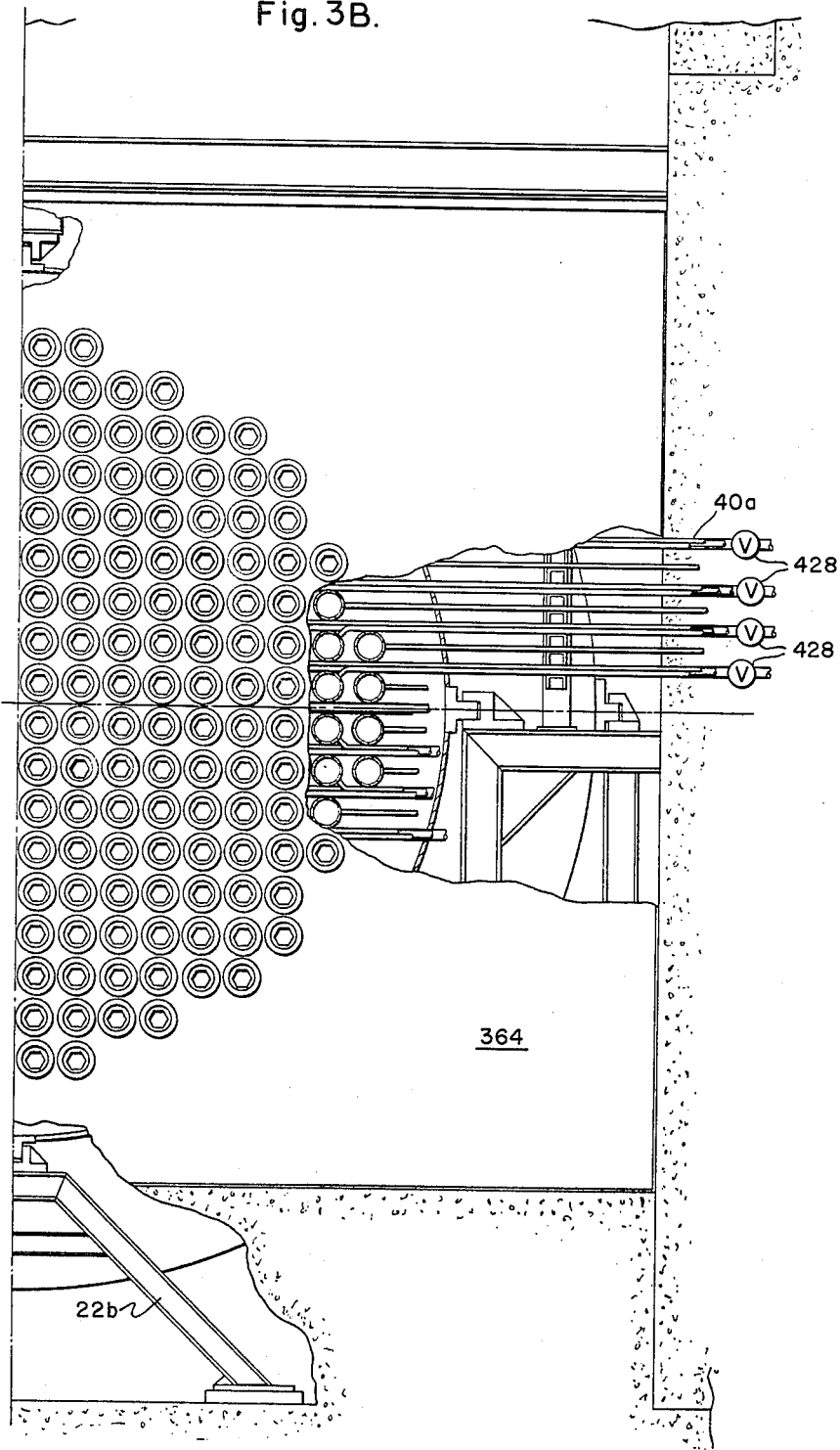

Sept. 28, 1965 R. M. CAMPBELL ETAL 3,208,915
PRESSURE TUBE NEUTRONIC REACTOR
Filed Aug. 31, 1959 11 Sheets-Sheet 7

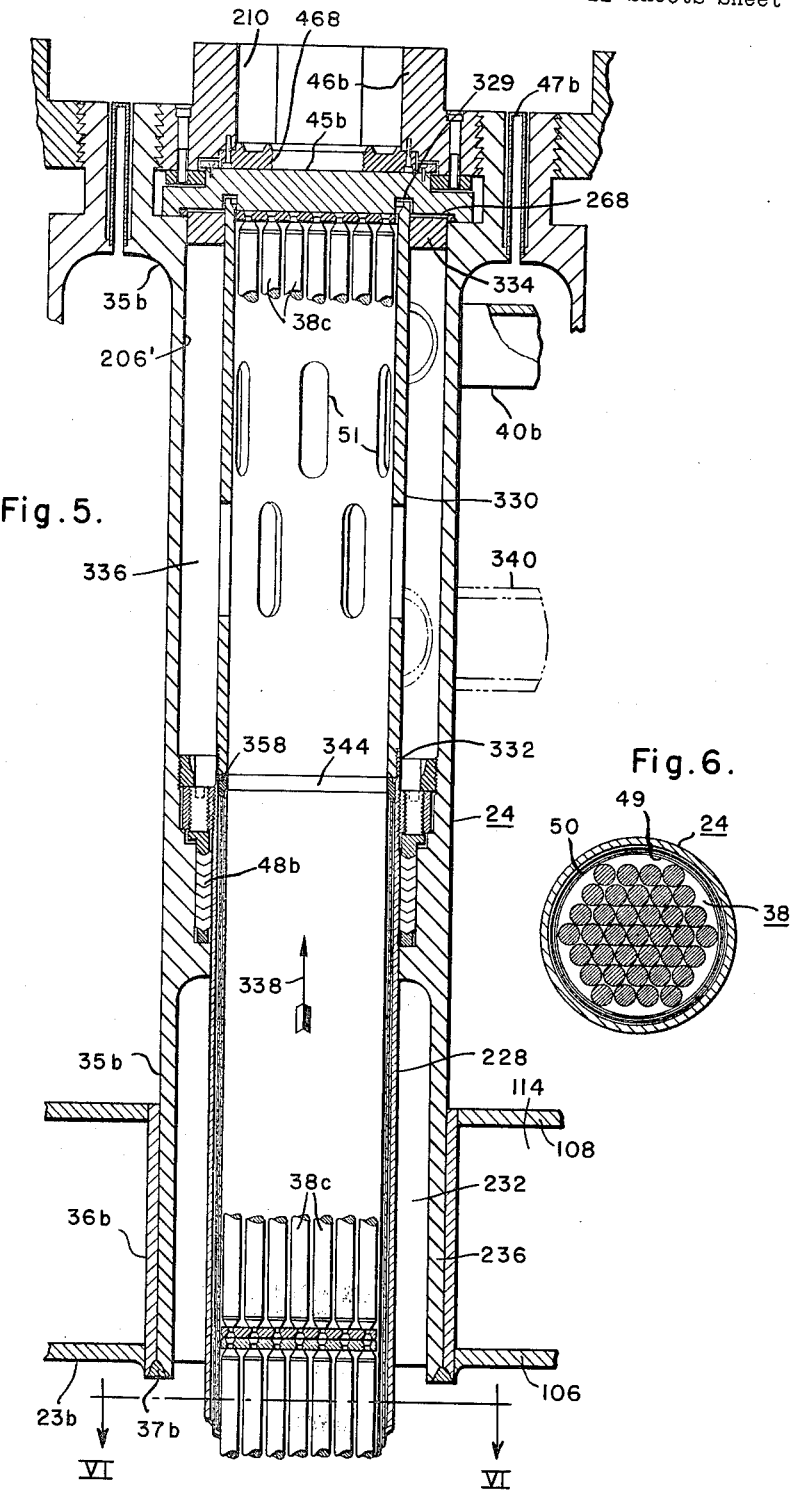

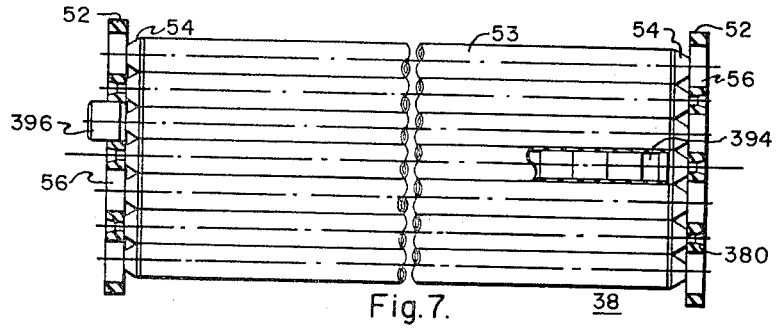
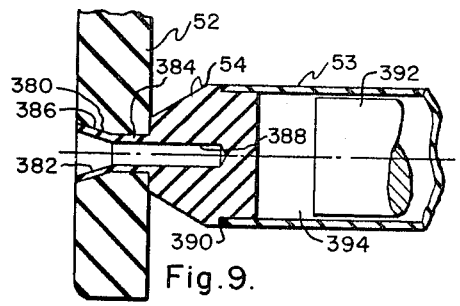
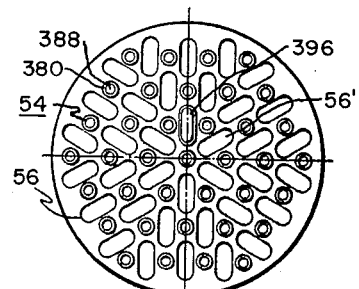
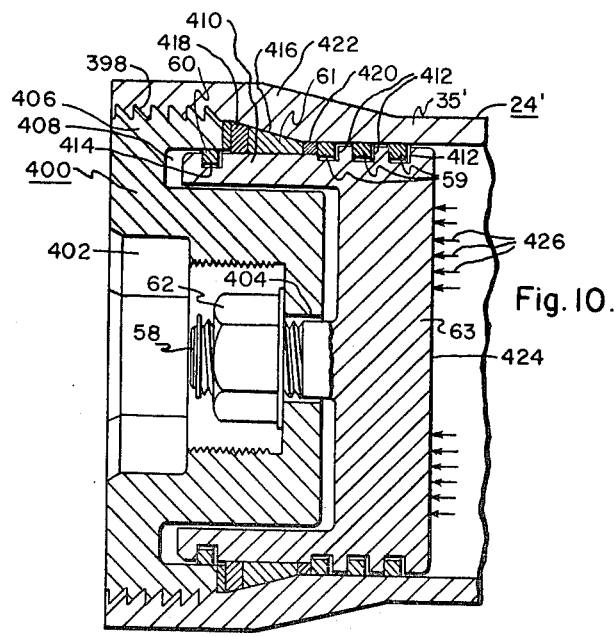

Sept. 28, 1965 R. M. CAMPBELL ETAL 3,208,915
PRESSURE TUBE NEUTRONIC REACTOR
Filed Aug. 31, 1959 11 Sheets-Sheet 11

United States Patent Office 3,208,915
Patented Sept. 28, 1965

3,208,915
PRESSURE TUBE NEUTRONIC REACTOR
Ronald M. Campbell, Burlington, Ontario, and Stuart M. Jones, Dundas, Ontario, Canada, assignors to Canadian Westinghouse Company, Limited, Hamilton, Ontario, Canada
Filed Aug. 31, 1959, Ser. No. 837,093
Claims priority, application Canada, Aug. 30, 1958, 757,767, Patent 633,912
7 Claims. (Cl. 176—31)

The present invention relates to nuclear power reactors and more particularly to a novel form of pressure tube reactor, novel fuel transporting, refueling, and manipulating arrangements therefor, and novel flow regulating and port closure devices for the individual pressure tubes of the reactor.

The pressure tube reactor of the invention is a novel and efficient arrangement of heterogeneous pressurized water typed reactor in which the large, thick-walled pressure vessel of a typical pressurized water reactor is replaced by a series of individual pressure tubes maintained in a closely spaced array and each containing a quantity of fissile material. With this arrangement the reactor vessel can be of nominal thickness and the individual pressure tubes likewise can be relatively thin due to their relatively small cross-sectional area. At the same time the pressure tubes, although relatively thin, can contain a pressurized water coolant at operating pressures corresponding to those of ordinary pressurized water reactors.

In accordance with the invention the individual pressure tubes are insulated by a novel baffling arrangement so that the moderator fluid maintained outside of the pressure tubes exists at a lower temperature for more efficient moderating characteristics. The insulating arrangement is disposed such that the walls of the pressure tube likewise exist at lower temperatures thereby permitting the use of softer and less expensive alloys in their fabrication.

The pressure tube reactor of the invention is further arranged so that novel forms of flow controlling and port closure devices can be operated quickly and directly without hazard to operating personnel. As a result the flow of reactor coolant through the various pressure tubes can be adjusted relative to one another to meet operating conditions and to rectify hot spot conditions such as may be produced by nucleate boiling within the core, by xenon tilt, or the like.

The reactor is further arranged so that nuclear fuel elements can be loaded and unloaded relative to the core structure during operation of the reactor by fuel transporting and handling machinery operated remotely in part and directly in part, without hazard to personnel. In accordance with the invention the fuel can be continuously cycled through the reactor as it is depleted so that the reactor need not be shut down in order to insert new fuel elements or to exchange a new core structure for a depleted core structure, as is required in known forms of heterogeneous reactors.

In view of the foregoing it is an object of the invention to provide a pressure tube reactor of novel and improved form.

Another object of the invention is to provide a reactor of the character described adapted for continuous refueling from an adjacent, shielded location.

Another object of the invention is the provision of novel and efficient fuel transporting and refueling machinery adapted for use with a pressure tube reactor.

Still another object of the invention is the provision of a pressure tube reactor in which the coolant flow through each individual pressure tube can be directed towards the unloading end of each tube in conjunction with a cross-feed fueling method for the reactor.

A still further object of the invention is the provision of a novel and efficient pressure tube reactor which is structurally arranged so that certain of the pressure tubes can be loaded with fuel elements at ends opposite from the loaded ends of adjacent pressure tubes for purposes of conserving space and of more quickly loading and unloading the pressure tubes.

Yet another object of the invention is the provision of a pressure tube reactor in which the pressure tubes are arranged horizontally and in which the reactor and pressure tubes are provided with novel biologically and thermally shielding arrangements.

Figure 1B:
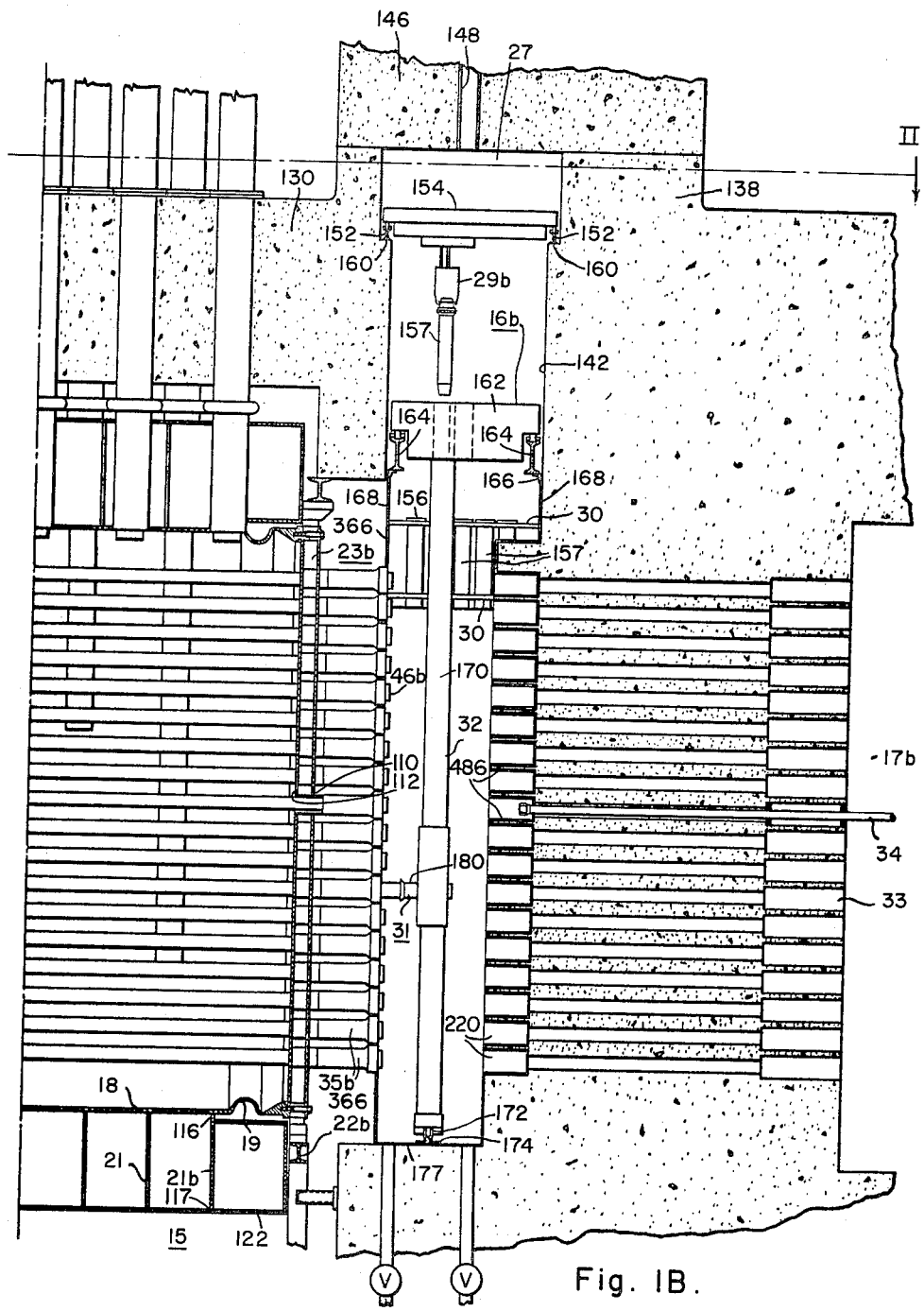
Figure 2A:
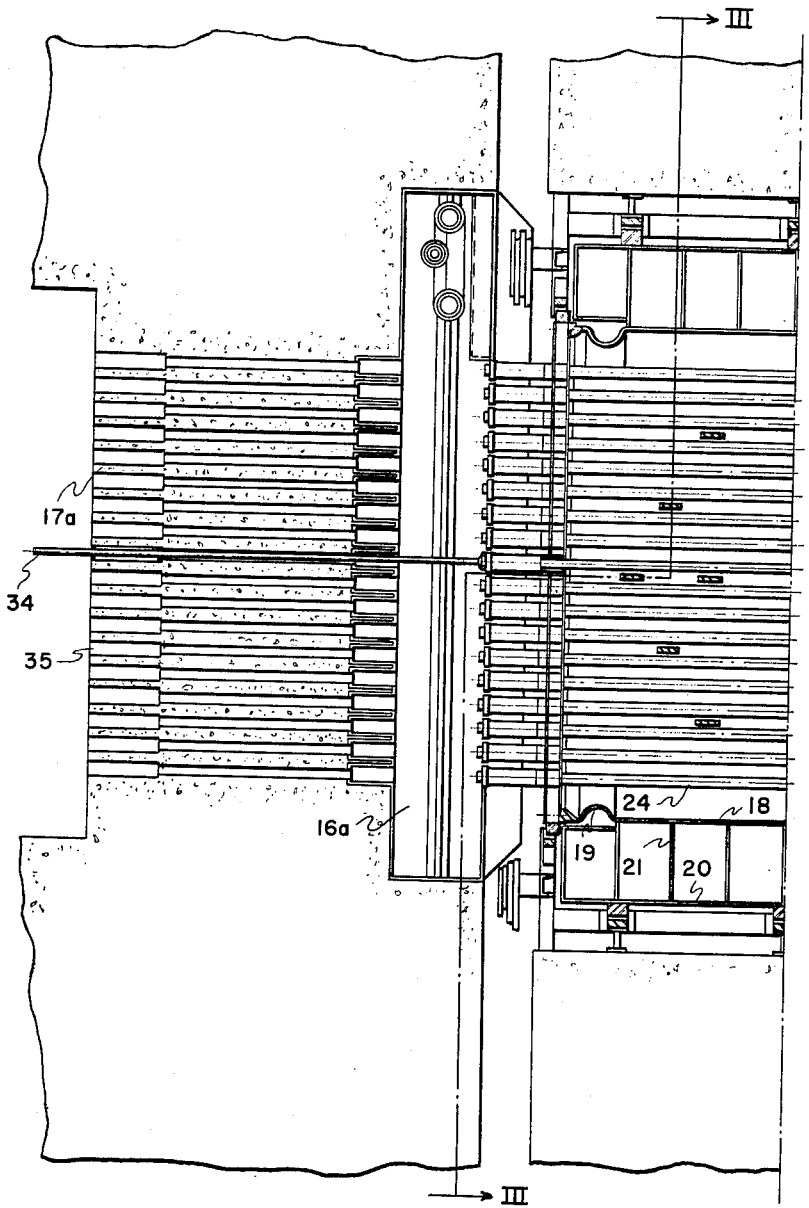
Figure 2B:
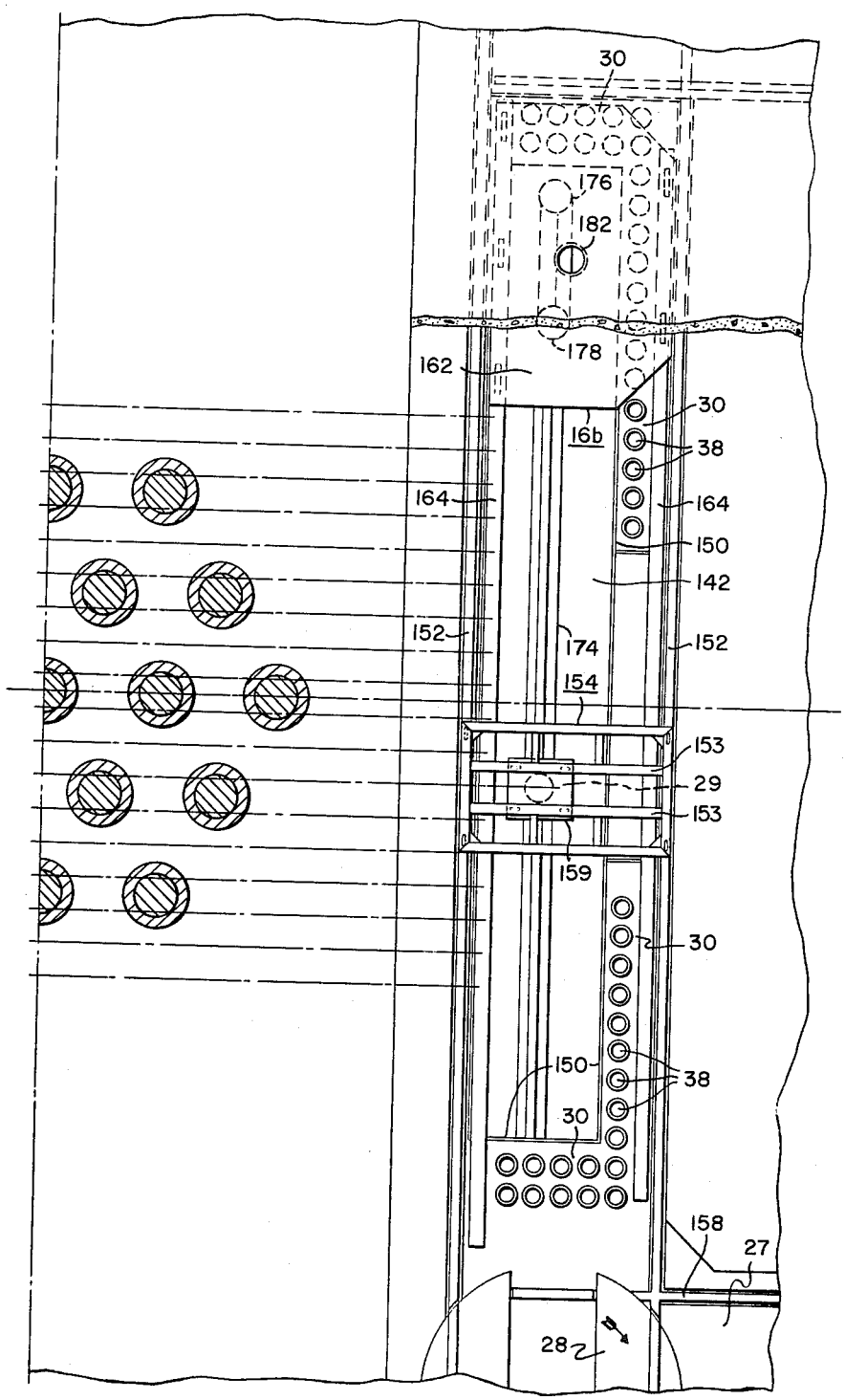
Figure 3A:
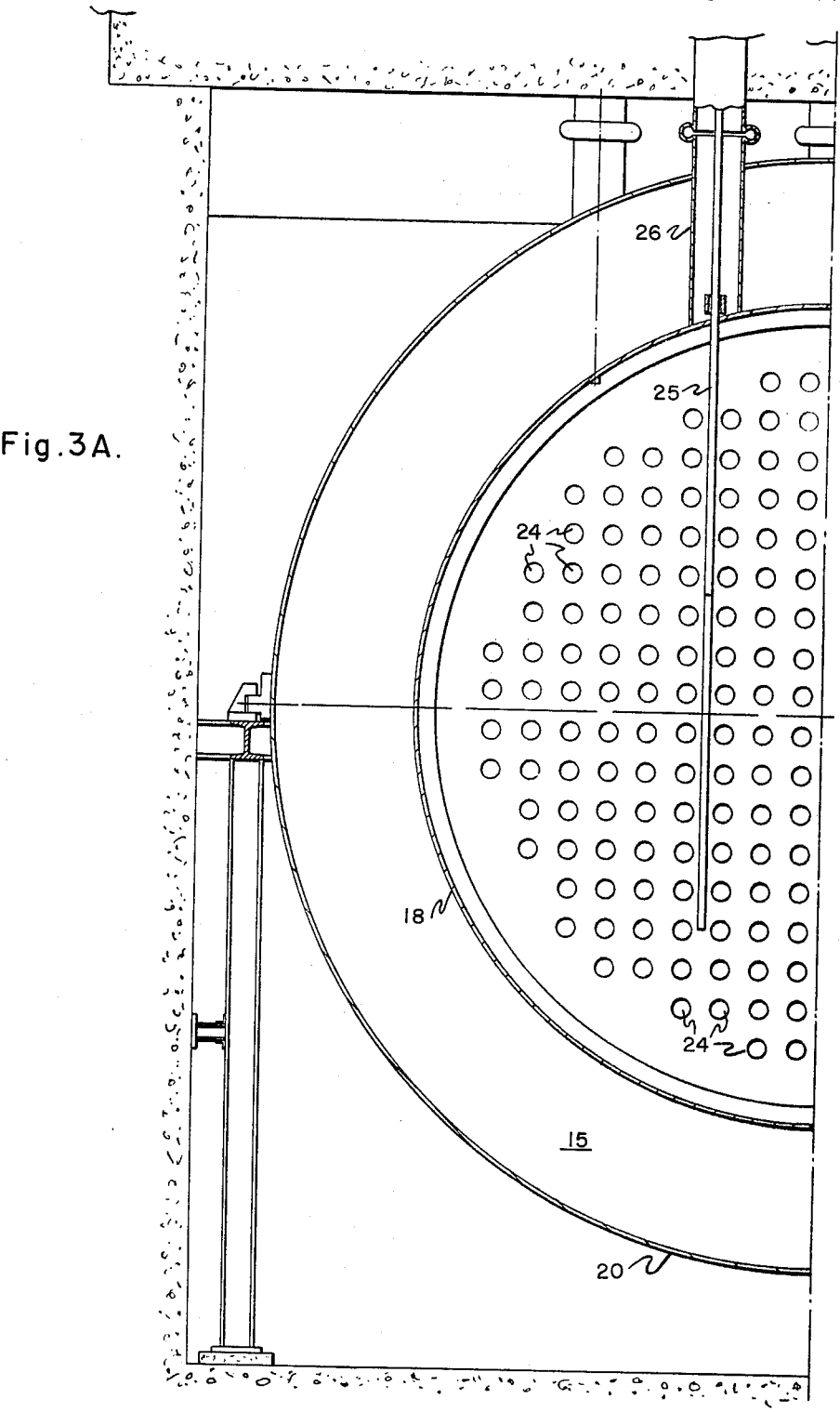
Figure 4:
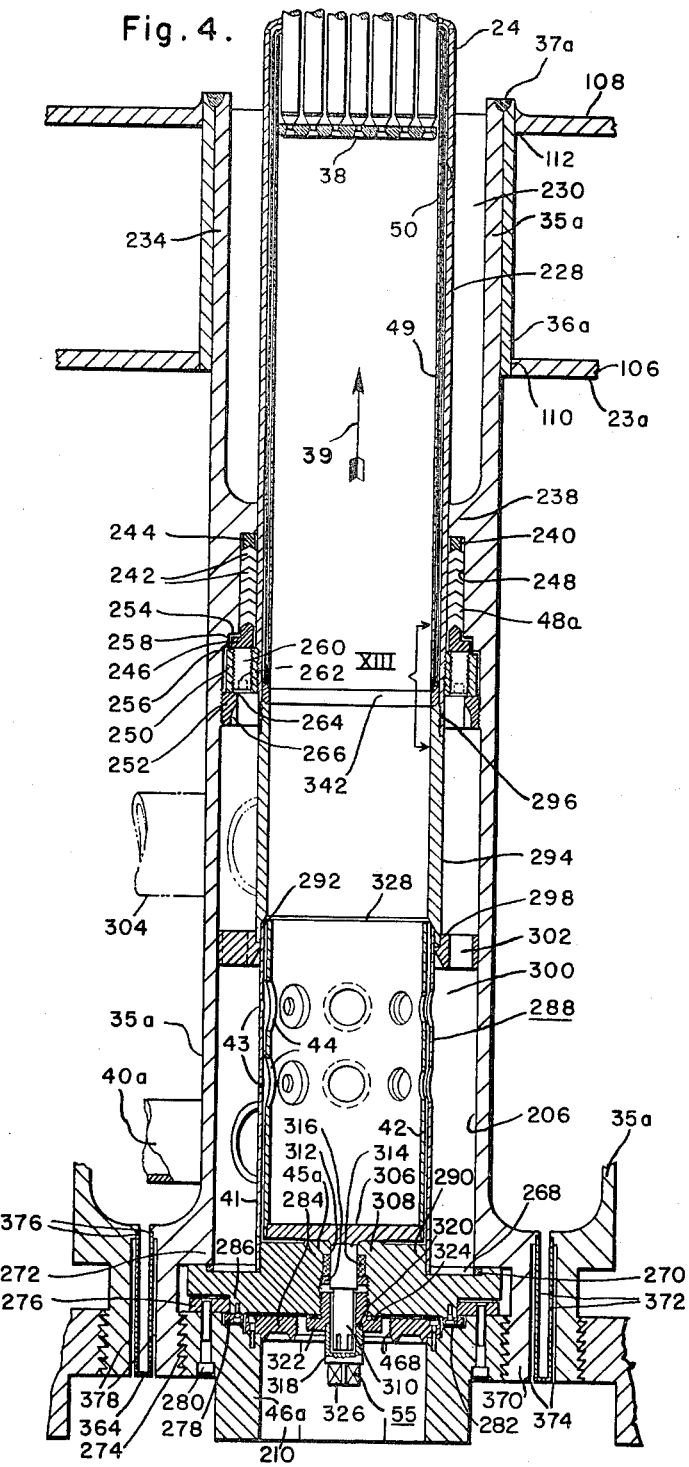
Figure 13:
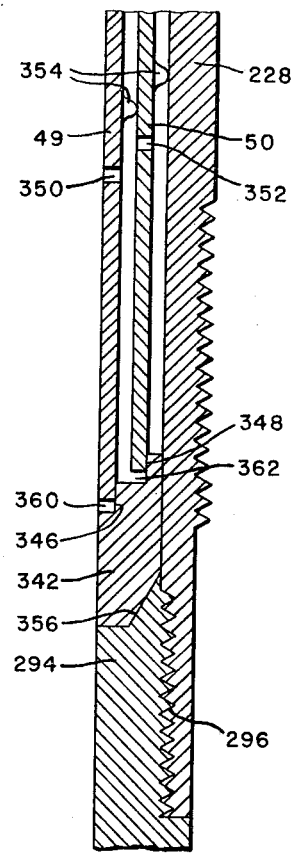
Figure 12:
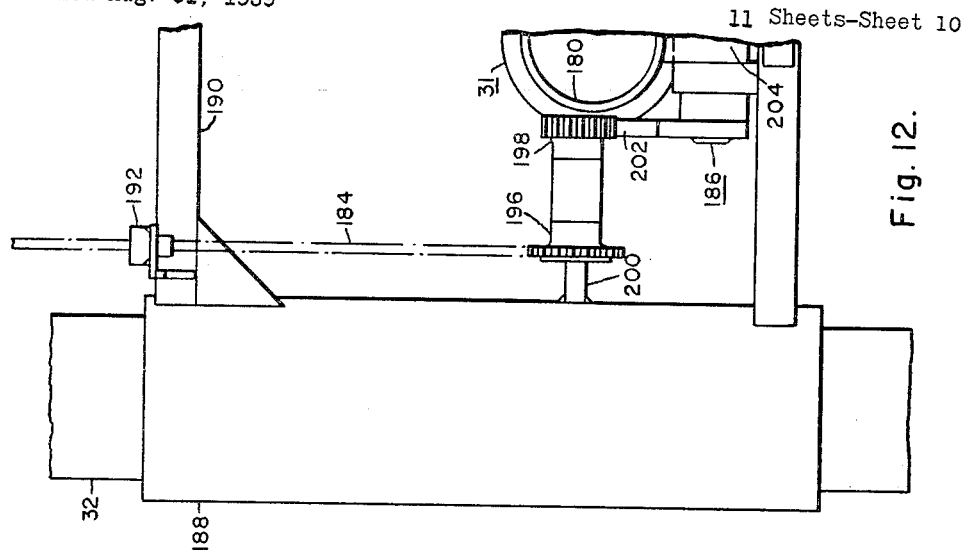
Figure 11:
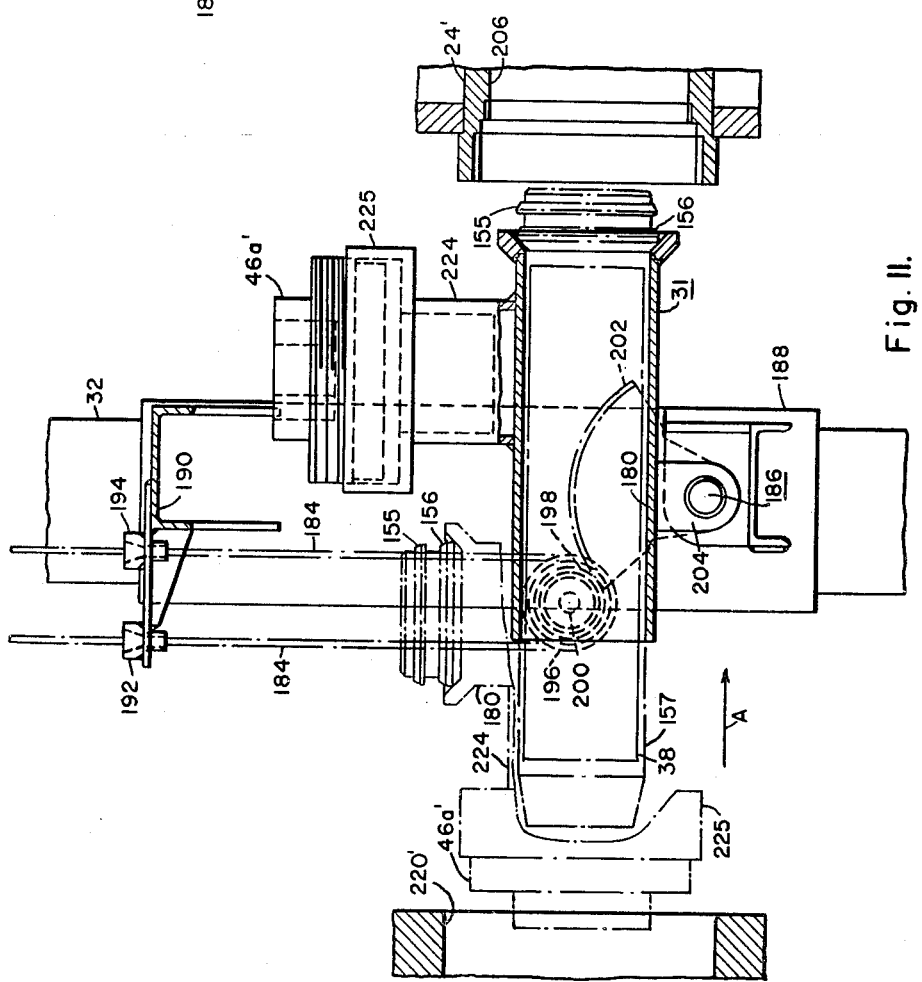
Figure 15:
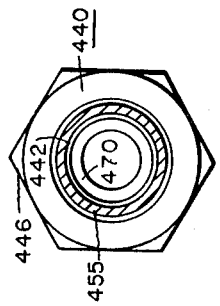
Figure 14:
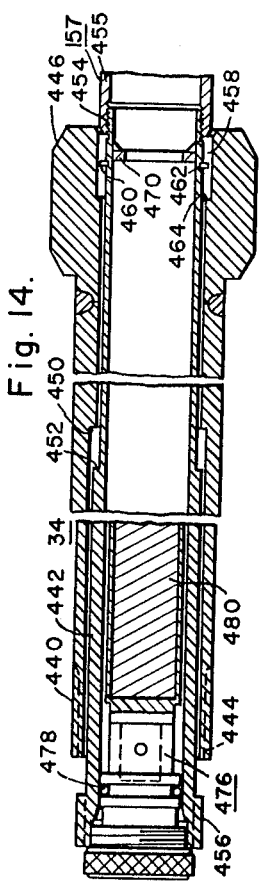
Figure 16:
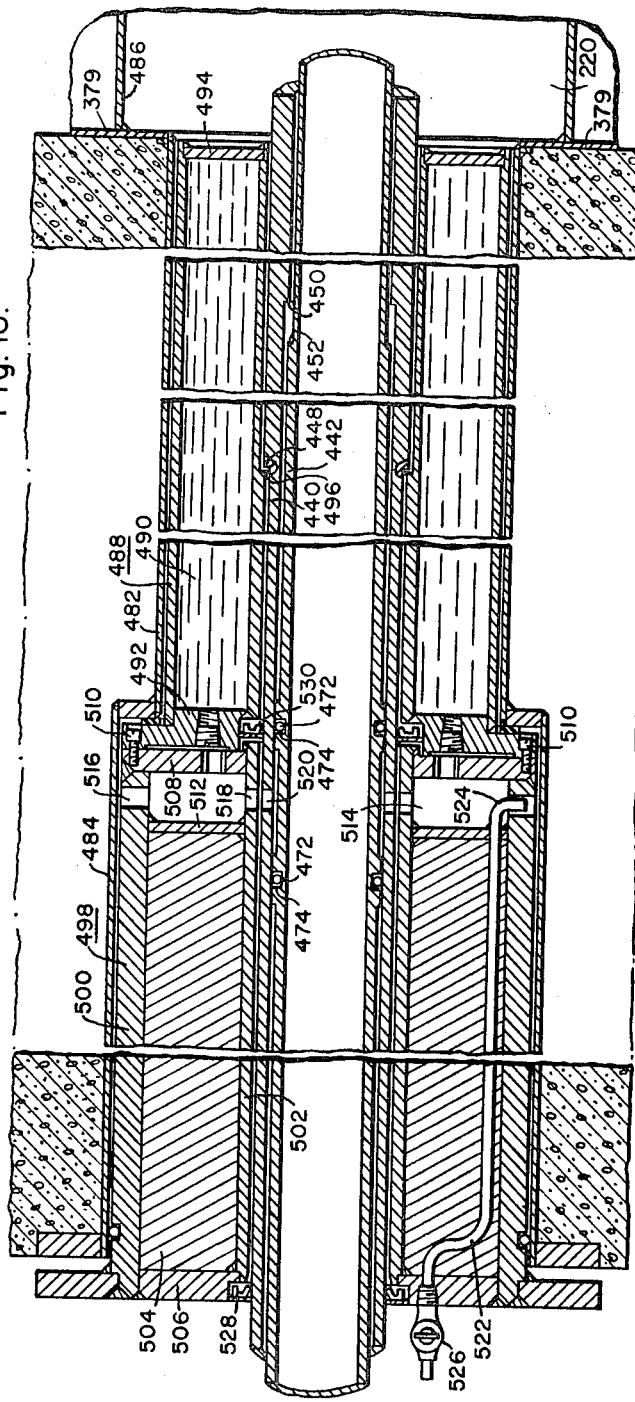

These and other objects, features and advantages of the invention will be elaborated upon during the forthcoming description of illustrative modifications of the invention with the description being taken in conjunction with the accompanying drawings, wherein:

FIGURES 1A and 1B form complementary portions of a longitudinally sectioned view of a pressure tube reactor constructed in accordance with the principles of the present invention, FIGS. 2A and 2B form complementary portions of a longitudinally sectioned view depicting the reactor of FIGS. 1A and 1B and taken along reference line II—II thereof, FIGS. 3A and 3B form complementary portions of a cross-sectional view showing the reactor of FIGS. 2A and 2B and taken along reference line III—III thereof, FIG. 4 is a partial, longitudinally sectioned view of one of the pressure tubes employed in the reactor illustrated in the preceding figures and showing one end portion of the pressure tube, FIG. 5 is a partial, longitudinally sectioned view showing the other end portion of the pressure tube depicted in FIG. 4, FIG. 6 is a cross-sectional view of the pressure tube taken along reference line VI—VI of FIG. 5, FIG. 7 is a side elevational view, partially sectioned, of a fuel element adapted for use with the reactor of the invention, FIG. 8 is an end elevational view of the fuel element shown in FIG. 7, FIG. 9 is a partial, longitudinally sectioned view of the fuel element shown in FIGS. 7 and 8 and illustrating portions of the fuel rods and a support disc thereof, and FIG. 10 shows an alternative construction of the port closure of the reactor pressure tube shown in FIGS. 4 and 5, FIG. 11 is a partial view of the fueling machine 16A and particularly the holder 31 thereof, partly in section, showing limiting positions thereof relative to the manipulator structure 17A and an associated pressure tube of the reactor, FIG. 12 is an elevational view of that portion of the fueling machine shown in FIG. 11 and looking in the direction of arrow A of FIG. 11, FIG. 13 is an enlarged view of that portion of the pressure tube 24 denoted by the bracket XIII of FIG. 4, FIG. 14 is a partial, longitudinally sectioned view of the manipulator 34 of FIGS. 1A and 1B, FIG. 15 is an end elevational view of the manipulator illustrated in FIG. 14, and FIG. 16 is a longitudinally sectioned view of one opening 33 and associated components through the manipulator structure 17a or 17b of FIGS. 1A and 1B.

In nuclear reactor, generally speaking, a quantity of a neutron-fissionable isotope, such as $U_{233}$, $U_{235}$ or $Pu_{239}$ or mixtures thereof, is subjected to fissioning in the reactor core by absorption of thermalized neutrons with the result that a self-sustaining chain reaction within the isotope is established by an excess of neutrons evolved in the fissioning process. The quantity of fissionable isotope is at least equal to the critical mass of the isotope which in turn is determined by the core environment on the basis of such factors as structural materials, fuel element spacing, and the amount of fertile isotope forming part of the total fissile material. Usually, however, an excess reactivity is built into a heterogeneous reactor core, and the amount of the excess is dependent upon the desired life-time of the core and the control rod worth provided to override initially the excess reactivity.

In the reactor of the invention it is contemplated that either natural or enriched uranium or other fissile materials can be employed therein. In the example presently to be described the fissile material desirably is provided in the form of natural or source grade uranium dioxide, contained in a relatively large number of fuel assemblies the construction of which will be described hereinafter. A number of these fuel assemblies are contained within each pressure tube and are provided with flow passages to permit the flow of coolant through the pressure tubes for the purpose of removing heat from the fuel elements. The fast neutrons evolved in the fissioning process, however, are thermalized by a moderator material maintained without the pressure tubes but within a container surrounding the tubes. When the fissile material includes chiefly natural uranium it is desirable to employ heavy water as the moderator in order to minimize the parasitic absorption of neutrons within the moderator fluid. In the reactor arrangement disclosed herein, the moderator is maintained at the lowest practical temperature, by the aforesaid insulational arrangement associated with each of the pressure tubes, in order to improve still further the neutron economy.

The use of flow regulating devices for each pressure tube permits the attainment of a flatter temperature gradient across the reactor core, by suitable manipulation of the flow regulating devices thereby minimizing the occurrence of hot spots and in addition increasing the effective high temperature heat transfer area of the core. Furthermore, the plant load factor can be increased due to elimination of the necessity of shutting down the reactor in order to refuel the same or to maintain individual ones of the pressure tubes.

Well known details of the operational theory of such reactors and of the nuclear physics calculations relative to the total quantities of nuclear fuel, control material, and coolant required for a given thermal output as set forth in the Fermi and Szillard Patent 2,708,656 issued May 17, 1955. Inasmuch as the structural dimensions and the aforementioned quantities will depend entirely upon the desired thermal output of the reactor and inasmuch as all of the structural dimensions, reactor parameters and the like must be calculated anew if a different thermal output is selected such calculations and dimensions are not necessary or desirable for the proper understanding of the invention. Moreover, these calculations can be readily performed by those skilled in the art. The necessary formulae and manner of making such calculations and selecting the indicated reactor dimensions or parameters are well known to reactor designers and are well-described and publicized in the aforementioned and other patents and in the now-voluminous literature on the subject.

Referring now to FIGS. 1A through 3B, the reactor system in this exemplary modification of the invention includes a cylindrical reactor tank generally indicated by 15, disposed with its long axis horizontal and provided at each of its circular ends with a fueling machine designated respectively 16a and 16b. Beyond each fueling machine is a manipulator assembly, designated 17a and 17b respectively. As is normal with nuclear reactors, the reactor tank or vessel and its associated components are completely enclosed by concrete shielding members serving both as part of the supporting structure and as means for biologically shielding personnel from the intense radiation associated with the reactor and the components thereof which after a period of operation become radioactive. These elemental components of the reactor disclosed herein will now be described in greater detail.

With reference to the previously mentioned figures, the reactor vessel or tank 15 comprises an inner cylinder 18 which forms in this example a moderator tank having relatively thin walls and provided adjacent each of its ends with an expansion joint 19. In this arrangement the expansion joint 19 is generally U-shaped in cross-section and the circumferential fold of metal formed thereby permits differential expansion between the reactor vessel or tank 15 and the pressure tubes 24, presently to be described, which operate at a higher temperature. The outward lateral edge of the expansion joint 19 is joined to a thickened terminal portion 100 to provide a space for a plurality of tapped apertures 102 for the receipt of machine screws 104 whereby the end of the moderator tank 18 is secured to end shield tanks 23a and 23b respectively.

The end shield tanks 23a and 23b are circular in configuration to conform with the ends of the moderator tank 18 and are formed from a pair of spaced circular plates 106 and 108, which are provided with aligned series of apertures, with one of each series being designated by the reference characters 110 and 112. The apertures 110 and 112 permit passage of components of the aforementioned fuel channel tubes 24. The space 114 between the circular plates 110 and 112 can be filled with light or heavy water to afford a measure of biological shielding. Each end shield tank 23a and 23b is supported by a supporting structure indicated schematically at 22a and 22b respectively whereby the entire reactor tank 15 is suspended.

The moderator tank 18, however, is reinforced and strengthened along its horizontal dimension by a plurality of radial reinforcing ribs 21. The outer edges of the ribs 21 in turn join a second cylindrical wall 20 serving as a reflector and shield tank for the moderator vessel 18. In furtherance of this purpose, the inner and outer edges 116 and 117 of the endmost ribs 21a and 21b are hermetically sealed, as by seal-welding, to the outer surface of the moderator tank 18 and to the inner surface of the outer tank 20. With this arrangement, then, the annular space 118 between the moderator tank 18 and the shield tank 20 can be filled with light or heavy water for reflecting and shielding purposes. If additional shielding is desired, borated or similarly treated water can be employed in the space 118.

Each end extension 120 and 122 of the shielding tank 20 is boxed in by an additional rib member 124 and sleeve member 126 to form additional shielding spaces 128 adjacent and bridging the areas between the end shield tanks 23a and 23b respectively, and the remainder of the shielding or reflecting area 118. Desirably, the components enclosing the spaces 128 are joined solely to the endmost ribs 21a or 21b to avoid interfering with the operation of the expansion joints 19. Alternatively, a sliding joint (not shown) can be formed between the sleeve member 126 and the thickened portion 100, at each end of the reactor vessel 15, adjacent the uppermost portion thereof so that part of the weight of the reactor vessel structure 15 is borne by the shield tank 20 and associated components. Thus, the entire reactor assembly is suspended within the concrete shielding identified generally by the reference character 130 by means of the supporting structures 22a and 22b.

A relatively large number of fuel channel tubes or pressure tubes 24 extend the full length of the moderator tank 18 and project at each of their ends beyond the respective end shield tanks 23a and 23b. As better shown in FIG. 3A, the pressure tubes 24 are uniformly distributed over the cross-sectional area of the moderator tank 18 in a square lattice array. Alternatively, depending upon the desired nuclear properties of the nuclear reactor core and on the initial percentage enrichment, other predetermined patterns can be utilized. In this example, a square lattice arrangement is employed since it is desired to make use of fissile material comprising natural uranium and therefore the fuel tubes 24 are arranged as closely as possible while still permitting passage of the transverse control rods 25 described below.

The space in the moderator tank 18 not occupied by the pressure tubes 24 contains, in this example, heavy water which serves as a moderator. Appropriate component parts of the moderator tank 18 and associated components desirably are hermetically sealed not only to prevent the escape of costly heavy water but also to ensure zero leakage of this water, which becomes momentarily radioactive upon neutron-irradiation. Such hermetic sealing can be effected by means of annular sealing welds (not shown), for example.

Control of the reactor system is achieved by means of a plurality of control rods 25 which are inserted transversely into the reactor core consisting of the horizontal pressure tubes 24. The control rods 25 are housed respectively in an equivalent number of shroud tubes 26 which are joined hermetically to the shield and moderator tanks 20 and 18 at their respective apertures 131 and 142. The integrity of the hermetically sealed system is preserved by closing the outward ends (not shown) of the shroud tubes 26. The shroud tubes 26 are supported primarily upon the concrete shielding structure 130 by means of the flanges 134.

Associated with each tube 26 is a control rod drive mechanism, which is likewise supported by the tube 26, and the control rod drive mechanism is arranged so as not to impair the hermetic character of the shroud tube 26. Suitable forms of driving mechanisms are disclosed and claimed in Patent Nos. 2,780,740, 2,812,455, 2,857,537, and 2,882,428, issued respectively to W. G. Roman et al., M. E. Noe, W. E. McCown, and E. Frisch. A suitable absorptional material, such as cadmium or boron, is associated with each control rod 25, the quantity of which is readily calculated by well publicized nuclear physics and reactor engineering formulae. The total quantity of neutron-absorbing material, of course, is dependent upon the uranium or other fissile material inventory and more particularly, upon the percentage excess reactivity thereof, which inventory is in turn closely related to the desired thermal output of the reactor.

The pressure tube reactor of the present invention is arranged in a novel fashion to take advantage of a previously suggested incremental cross-feed fueling principle (AECL Report 382, Canada Dec. 10, 1956, entitled "Low Cost Fueling Without Recycling," W. B. Lewis). The important feature of this principle is that each fuel channel tube in the reactor contains a number of fuel elements placed end to end, and new fuel elements are charged into opposite ends of adjacent channels so that a new fuel element in one channel always lies adjacent to a fuel element in the next channel which is nearing maximum depletion. Thus, the excess reactivity of the new fuel may be used to compensate the depletion of the irradiated fuel. As a fuel element is loaded into one end of the pressure tube, all of the fuel elements in that pressure tube are advanced through the reactor core, and the last element in the pressure tube is discharged from the other end thereof. For this reason, a fueling machine 16a or 16b is provided at each end of the reactor vessel 15.

Referring now more particularly to the fueling system of the reactor, a fuel transporting and storage tunnel 27 is formed laterally through each end shielding member 136 and 138 so that it adjoins the upper portion of each fueling pit 140 and 142. The adjacent portions of the tunnel 27 are enclosed by addition of a fueling pit cover 144 or 146, each of which is provided with one or more observation ports 148. As better shown in FIG. 2B, each storage tunnel 27 provides access for the individual fuel elements 38, which can be stored in this example upon storage racks 30, which are supported adjacent the top of the fueling pit 140 or 142. In this arrangement, the storage racks 30 are further arranged adjacent the inner openings of the storage tunnels 27. The free or overhanging edges of the racks 30 are provided with barrier members 150 to prevent the fuel elements 38 from being inadvertently dropped from the racks 30 to the bottom of the fueling pit 140 or 142.

Immediately above the storage racks 30 but yet within each fueling cavity 140 or 142, a pair of tracks or rails 152 are mounted. Mounted for movement upon and in cooperation with the rails 152 is a universal crane arrangement 154. The crane 154 supports a remotely operated fuel transporter 29 as better shown in FIGS. 1A and 1B of the drawings. The transporter 29 also is of known design and is arranged to grapple remotely the upper flanges 155 (FIG. 11) of canisters 157 into which the fuel elements 38 are inserted respectively, as aforesaid. The fuel transporter serves the functions of bringing the fuel elements 38 into the fueling pits 140 or 142, as presently to be described, and of loading the fuel elements into the aforementioned fueling machine 16a or 16b. The fuel elements 38, contained within their individual canisters 157, are stored within each pit 140 or 142 by insertion into suitable aligned apertures of the storage racks 30 where the fuel elements are supported for storage by the flanges 156 of their individual canisters 157.

As better shown in FIG. 2B, however, the fuel elements 38 initially are brought into each fueling pit through the associated storage tunnel 27 and by means of the crane 154. In furtherance of this purpose, a second pair of rails, one of which is shown at 158, are mounted for operation with the crane 154, and the latter pair of rails are disposed at substantially right angles to the rails 152 for extension longitudinally through the access tunnel 27. A turn-table 28 is provided at the junction between the pairs of rails 152 and 158 so that the crane 154 can make the necessary angular turn. As better shown in FIGS. 1A and 1B, the rails 152 and 158 can be supported, for example, upon offset portions 160 of the end shielding structure 136 or 138. Universality of movement, of course, is imparted to the crane 154 by the motion of the inner carrier 159 upon a pair of transverse rails 153 forming part of the crane structure.

Turning now to a description of the fueling machines 16a and 16b, particular reference is made to FIGS. 1B, 2B, FIGS. 11 and 12 which are related only to the fueling machine 16b, as contained in the fueling pit 142, since both machines and both fueling pits are essentially identical except for reversal of parts. According to the present invention, the fueling machine 16a or 16b comprises a tramcar 162 cooperating with a pair of tracks or rails 164, (FIG. 2B). The rails 164, as better shown in FIG. 1B, are mounted respectively upon a pair of brackets 166 mounted adjacent the upper edges of the metallic linings 168 of the fueling pit 142. To the underside of the tramcar 162 is affixed a standard 32, the lower end of which is provided with a pair of wheels 172 or other anti-frictional device for engagement with a single rail member 174 mounted upon floor 177 of the fueling pit 142.

Slidably mounted upon the standard 32 is a fuel element and fuel port closure holding device 31. As shown in FIG. 2B, the tramcar 162 and the attached standard 32 are arranged by reason of the rails 164 and 174 and the dimensions of the fueling pit 142 to traverse the entire group of pressure tubes 24 in the horizontal direction, while the holder 31 (FIG. 1B) is adapted to traverse the entire group of pressure tubes in the vertical direction. With this arrangement, the holder 31 can be moved to any one of the relatively large number of tubes 24 contained within the moderator tank 18.

In the operation of the fuel handling system, a cannister 157 containing one fuel element 38 and held by the fuel transporter 29 is lowered through one of the access ports 176 or 178 (FIG. 2B) of the tramcar 162 where it is loaded into the fuel tube 180 of the holder 31, when the tube 180 is in its upright position, as shown by the phantom outlines of FIG. 11. To assist this operation, an observational port 182 is provided in the tramcar 162 at an area intermediate the access ports 176 and 178.

The holder 31, as better shown in FIG. 11, is raised and lowered upon the standard or guide column 32 by means of a drive chain 184. The upper terminus (not shown) of the drive chain 184 is secured to suitable mechanism (not shown) mounted upon the tramcar 162 for the purpose of raising and lowering the lower terminus of the chain 184 by raising and lowering both strands thereof, and thus to slide the holder 31 over the entire length of the standard 32. In furtherance of this purpose, the holder 31 is pivotally connected, as denoted by the reference numeral 186 to a tubular bracket 188 slidably mounted upon the standard 32. Adjacent the upper end of the bracket 188, an angle bracket 190 is mounted and is provided with tubular inserts 192 and 194 through which the strands of the chain 184 pass respectively.

As better shown in FIG. 12, the chain 184 engages a driving sprocket 196 which is coupled to a pinion gear 198, both of which are mounted upon an axle member 200 secured to the tubular bracket 188 as by welding. As shown in FIGS. 11 and 12, the pinion gear 198 cooperates with a fan-shaped gear member 202, which is rigidly secured to the pivoted tab 204 secured to the fuel holding tube 180. For purposes presently to be described, rotation of the pinion gear 198 by normally driving the chain 184 then causes the holder 31 to be rotated through about 90 degrees to cover the tilting quadrant, the limits of which are defined by the solid and phantom outlines of the holder 31, as shown by FIG. 11. Obviously, however, a separate driving mechanism can be employed to raise and lower the holder 31 if desired. At these positions, various means are provided for temporarily loading a fuel port closure 46a' upon the holder 31 and for pushing the fuel element 38 inserted into the holding tube 180 from the tube 180 into an open fuel port 206, all of which are described more fully hereinafter. Each fueling pit 140 and 142 is sealed for flooding to a point just below the tramcar 162 for biological shielding purposes. Desirably the pits are flooded with the same liquid as that employed for cooling the interior of the pressure tubes 24. With this arrangement, shielding is obtained without contacting the driving and controlling mechanism associated with the tramcar 162 and the crane 154 with the flooding liquid. In furtherance of this purpose each fueling pit 140 or 142 is sealed and provided with flooding and drainage conduits as described hereinafter.

To seal each fuel pit 140 or 142, a metallic cover member 364 or 366 extends from floor cover 368 (FIGS. 1A and 1B) to the upper vessel shielding structure 130 and is joined to each of the end tubes 35a or 35b, respectively, at positions adjacent their widened mouth portions 370. Desirably, the sheet member 364 is sealed to the mouth portions 370 in order to seal the fueling pit 140 or 142 from the reactor vessel 15. This joining is accomplished in a manner so that differential expansion among the pressure tubes 24, which can be operated at slight differentials in temperature as aforesaid, can occur without imparing the seals. In furtherance of this purpose, the sheet 364 is provided with connecting members 372 (FIG. 4) positioned respectively at apertures 374 formed in the sheet 364 for reception of the mouth portions 370 of the pressure tubes 24, respectively. The connecting members 372, therefore, desirably are circular and their inner edges are welded respectively, as indicated by the reference characters 376, to the inner extremities of the widened portions 370 of the pressure tubes 24. The connecting members 372, therefore, are capable of absorbing the thermal stresses induced by differential expansion among the pressure tubes 24, and in furtherance of this purpose, each of the widened portions 370 are offset, as indicated by reference character 378 behind the major proportion of the connecting members 372. The floor cover of each pit 140 or 142 in turn is sealed and joined to a second apertured sheet member 379 (FIG. 16) which is sealed to the liners or sleeves 486 of the closure receiving openings 220. The sleeves 486 and the manner of sealing them to the manipulating structure 17a or 17b and to the manipulator 34 are discussed below.

Referring again to FIGS. 1A, 1B, 2A, and 14–16 the manipulator structures 17a and 17b and manipulator 34 will now be described in detail. The structures 17a and 17b are substantially similar except for reversal parts and accordingly, only the manipulator structure 17a will be detailed. The manipulator structures 17a and 17b each contain a number of access channels or manipulator apertures 33, which are aligned respectively with the pressure tubes 24 mounted in the reactor vessel 15. In this arrangement, each of the channels 33 is capable of receiving a manipulator assembly 34 which can be operated either manually or by remotely operable equipment, in accordance with known technology.

With particular reference now to FIGS. 14 and 15 an exemplary form of the manipulator 34 is shown in detail therein. The manipulator 34 comprises generally coaxial 440 and 442, the outer tube 440 being arranged for insertion into an opening 33 of the manipulator structure 17a. The outward end of the tube 440 is provided with a keying arrangement 444 for rotation by a suitable wrench. The inward end of the outer tube 440 is provided with, in this example, a hexagonal configuration 446, which is adapted for engagement with the complementary shaped recess 210 (FIG. 4) of the closure nuts 46a and 46b. The outer tube 440 is stepped as noted by reference character 448 in order to eliminate radiation streaming through the opening between the manipulator 34 and the associated components of the passage 33. Similarly, the outer surface of tube 442 and the inner surface of tube 440 are stepped as denoted by reference characters 452 and 450, respectively with the steps being removed longitudinally to permit relative longitudinal movement of the inner tube 442 relative to the outer tube 440 for purposes described hereinafter.

The inner end of the inner tube 442 is provided with a threaded or otherwise keyed configuration 454 for engagement with the inner cylindrical bore of the canister 157 adapted to contain one of the fuel elements 38. When so engaged the inner tube 442 is drawn longitudinally to the left as viewed in FIGS. 14 and 16 by means of a suitable tool applied to the keyed configuration 456 disposed at the outer end of the tube 442. This action draws the projecting end 455 of the aforementioned canister into an annual recess 458 formed interiorly in the adjacent portion of the outer tube 440. The partial insertion of the canister end 455 into the annular recess 458, of course, serves to stabilize the former during movement by the manipulator 34. Alternatively, the keying means 454 can take any conventional form such as a bayonet and slot arrangement formed cooperatively on the projecting inner end of the tube 442 and the canister end 455.

Longitudinal movement of the inner tube 442 relative to the outer tube 440 is defined by contact between the stepped portions 450 and 452 at one extremity of movement and by a snap ring 460 inserted into a groove 462 formed on the outer surface of the inner tube 442. The other extremity of movement thus is defined by engagement of the snap ring 460 with the inner end 464 of the annular recess 458.

The thread 454 provided on the exterior surface of the adjacent end of tube 442 serves in addition to cooperate with interior thread 468 of each closure nut 46A and 46B to retain the closure nut on the hexagonal configuration 446 during movement thereof by the manipulator 34. The inward end of the inner tube 442 is stabilized against deformation by means of a spider ring 470 welded or otherwise secured to the inner surface of the tube 442.

As better shown in FIG. 16 leakage between the tubes 440 and 442 is prevented in this example by a pair of O-rings 472 seated respectively in a pair of circumferential grooves 474 formed on the outer surface of the inner tube 442. Leakage of liquid contained within the fueling pits 140 or 142 through the inner tube 442 of the actuator 34 is prevented by a lead filled plug member denoted generally by the reference character 476, which is sealed to the inner surface of the tube 442 by means of an O-ring 478. The lead filling 480 of the plug provides biological shielding for operating personnel at the outer surface of the manipulator structure 17a or 17b and operating the manipulators 34.

As shown in detail in FIG. 16 the manipulators 34 are inserted respectively through the openings 33 (FIG. 1) of each manipulator structure 17a or 17b. Various components are associated with each opening 33 to provide biologic shielding and to prevent leakage and radiation streaming through the junctions between the components. Into the major proportion of each opening 33 and its associated enlarged end portions 216 and 220 are inserted respectively closely fitting metallic sleeves 482, 484 and 486. The sleeves 482, 484 and 486 are stepped relative to one another to conform to the aforementioned opening portions and to prevent radiation streaming. Into the sleeve 482 is inserted an annular shielding tank 488 containing water or other shielding medium within its annular volume 490. The tank 488 is closed and sealed by end members 492 and 494. The annular opening through the tank 488 is stepped complementarily with the stepped configuration 448 of the outer manipulator tube 440, as denoted by reference character 496.

The annular space between the outer portion of each manipulator 34 and the enlarged outer opening 216 (FIG. 1A) of the associated passage 33 is filled and shielded by an annular lead containing plug denoted by the reference character 498. The plug 498 is formed from coaxial sleeve members 500 and 502 and the space therebetween is filled with lead 504. The plug is then completed by welding or otherwise securing annular end members 506 and 508 to the adjacent ends of the sleeves 500 and 502. For ease and assembly the shield tank 488 is joined to the end member 508 of the annular plug 498 by means of a plurality of cap screws 510.

An additional annular member 512 is secured to the sleeves 500 and 502 of the annular plug 498 at a position adjacent the inner ends thereof to define, with the end member 508, a weep space 514 for the purpose of collecting any leakage through the junction and between the manipulator 34 and structural components associated with the channel 33 as a result of flooding the adjacent fueling pit 140 or 142. In furtherance of this purpose various junctions between these components and the manipulator structure 34 are connected to the weep space 514 by means of openings 516, 518 and 520 extending transversely through adjacent portions of the annular plug sleeves 500 and 502 and through the outer manipulator tube 440. Such leakage is removed from the weep space 514 of each channel 33 by means of a conduit 522 the inner end 524 of which is curved for insertion into the transverse opening 516 for substantially complete removal of the liquid from the weep space 514. The outer end of the conduit 524 is provided with a stop cock 526 and is adapted for connection to a suitable pumping means (not shown).

The junctions between the outer tube 440 of each manipulator 34 and the annular plug 498 and annular shield tank 488 are secured respectively by a pair of gasket members 528 and 530 secured in this example respectively to the end members 506 and 492 of the plug 498 and of the annular tank 488.

The spaces between the channels 33 including their widened portions 216 and 220 are filled with concrete as denoted by the reference numeral 218, for biological shielding purposes. Desirably, the concrete 218 is densified with known additives, such as barytes.

At the inward ends of the channels 33, i.e., the ends adjacent the fueling pit 140, the channel widened portions 220 provide storage receptacles for the fuel port closure nuts 46a or 46b, as the case may be. The metallic liners or sleeves 486 inserted into each of the storage receptacles 220 avoid chipping the concrete shielding material enclosed between the receptacles 220, and also prevent clogging the threads of the closures 46a and 46b with concrete material. With this arrangement, the manipulators 34 inserted in the channels 33, can be operated in a predetermined sequence, to open and close the fuel loading ports 206 (FIG. 11) of the adjacent ends of each of the pressure tubes 24 so that fuel elements 38 can be loaded and removed from appropriate pressure tubes 24.

Such loading and unloading is accomplished in cooperation with the fuel transporting and loading machines 29a and 29b, 16a and 16b. As pointed out previously, in the operation of these machines the fuel receiving tube 180 of the holder 31 is moved to its vertical position for receipt of a fuel element 38 and its individual canister 157 (FIG. 11) from the transporting mechanism 29a. As shown in FIG. 11, however, the fuel holding tube 180 of the holder 31 is provided additionally with a tubular closure nut holder 224 secured to the holder 180, as by welding, in a substantially right-angular relationship. Thus, when the fuel holder 180 is disposed in its vertical position, the nut holder 224 is disposed substantially horizontally and in this position the holder 31 is moved by means of the previously described mechanism of the fueling machines 16a and 16b until the nut holder 224 is aligned with that one of the closure nut storage recesses 220 which is directly opposite the now open end of the pressure tube 24 to which the fuel element 38 is to be added. While in this position, the manipulator 34 is utilized to thread the closure nut 46a' (FIG. 11) onto the holder 224 of the fuel loading machine 16a. For this purpose an outer flange member 225 of the nut holder 224 is tapped interiorly to receive a threaded portion of the nut. The pinion gear 198 then is rotated to move the holder 31 through approximately 90 degrees so that the fuel holding tube 180 is now substantially horizontal. The tubular holders 224 and 180 are disposed relative to each other and to the pivot arrangement 186 so that when the holder 31 is turned as aforesaid, the fuel holding tube 180 becomes aligned with the adjacent pressure tube 24' without further moving the holder 31 or the standard 32. The fuel closure nut 46a' thus is removed from its storage recess 220 so that the manipulator 34 can be reinserted to push the fuel element 38 within the canister 157 to the right as viewed in FIG. 11 and into the open end of the pressure tube 24'.

After the fuel element 38 has been inserted as explained above, the holder 31 again is rotated through 90 degrees, again without moving the holder 31 or the standard 32, to the position shown in phantom outline in FIG. 11. At the latter position, the manipulator 34 is reengaged with the closure nut 46a' mounted on the holder 31, and the nut 46a' is removed therefrom for either storage in its receptacle 220' or for immediate replacement within the fuel port 206 of the pressure tube 24', depending upon whether adjacent pressure tubes 24 are to be loaded or unloaded with fuel elements.

When unloading a fuel element from one of the pressure tubes, the reverse procedure is followed. Such unloading, of course, will be accomplished at the opposite end of the aforementioned pressure tube 24' but nevertheless will be described with reference to FIGS. 11 and 12 since the associated machinery and other components are identical except for reversal of parts. Assuming now that the pressure tube 24' is to be unloaded from the end thereof shown in FIG. 11, the addition of a fuel element at the other end thereof will cause the fuel element 38 to be expelled from the fuel port 206 since each pressure tube 24 is substantially filled with fuel elements 38 arranged in a tandem array. Thus, when the holder 31 is aligned as shown in solid outline, in FIG. 11, the addition of a fuel element at the other end of the tube 24' pushes the outermost fuel element 38b into the holding tube 180.

When inserting a fuel element from an opposite end of the tube 24' (FIG. 11), the tandem group of fuel elements including the inserted element are positioned as shown in FIGS. 4 and 5. When thus positioned, the major proportion of the depleted fuel element 38c (FIG. 5) is pushed from the other end of the pressure tube 24' and loaded into the canister 157 which is butted against the end of body tube 330. The manipulator 34 is then actuated to engage the left end of the canister 157, as viewed in FIG. 14, to remove further the element 38a and its individual canister 157 from the pressure tube 24' so that the extreme right end thereof clears the fuel port 206 of the pressure tube 24'. When the fuel element 38c and its canister 157 is in the vertical position in the holder 31, they are, of course, prevented from dropping through the holding tube 180 by means of the associated lower canister flange 156. Prior to this operation, however, the fuel port closure nut 46a' has been removed and temporarily mounted upon the holder 31 as described above. After the fuel element 38c is positioned as aforesaid, the holder 31 is again rotated to its vertical position. Subsequently, the manipulator 34 is employed to remove the closure 46a' from the holding tube 224 for storage in the recess 220 or for replacement into the corresponding closure 206 of the pressure tube 24'.

As described below, the manipulator 34 is employed for making various adjustments relative to the pressure tubes 24. These adjustments relate to the regulation of coolant flow through individual ones or all of the pressure tubes. As pointed out previously the manipulator structure including the shielding is sufficiently thick and closely conforms with the component parts of the channels 33 so that adequate shielding is provided for personnel standing adjacently behind the manipulator structure 17a or 17b and operating the manipulator assemblies 34 manually, with the result that the need for complicated and expensive remote handling apparatus for this purpose is avoided.

With reference to FIGS. 4 to 6 of the drawings, a pressure tube assembly 24 is shown in detail together with certain of its fuel elements 38 and the relative positions thereof. In this arrangement of the invention, each pressure tube 24 includes a central or body portion 228 which extends through the end shield tanks 23a and 23b with clearances 230 and 232 thereat. Adjacently and outwardly of the tanks 23a and 23b the body portion 228 is joined respectively to a pair of fuel port tubes 35a and 35b in the manner described below. The port tubes 35a and 35b are in turn joined as by welding at 37a and 37b, respectively, to transition or shielding tubes 36a and 36b, the latter of which are joined and sealed, as by seal welding, to the spaced plates 106 and 108 of the associated end shield tank. The junctions therebetween are made at the respective apertures 110 and 112 associated with each pressure tube 24 and thus the transition tubes 36a and 36b serve to seal the shielding space 114 within each end shield tank 23a or 23b, and to secure the plates thereof together.

Additional means are provided for thermally shielding the pressure tubes 24 from thermal stresses developed by contact of their port tubes 35a and 35b and the relatively cool end shield tank structures 23a and 23b respectively. In furtherance of this purpose, the inner end portions 234 and 236 of the tubes 35a and 35b are spaced outwardly of the body tube 228 in order to center the body tube 228 relative to the openings 110 and 112 (FIGS. 1A and 1B), and to maintain the annular spaces 230 and 232 therebetween. Thus the thermal stresses are concentrated within the inner end portions 234 and 236, and the moderator fluid contained within the spaces 230 and 232 provides thermal insulation between the hot body tube and the surrounding components of the end shield tanks.

In this arrangement, the end tubes 35a and 35b are joined to the associated ends of the body tube 228 by means of a chevron-type packing gland 48a and 48b, respectively. Adjacent each gland 48a or 48b, however, the associated end tube is provided with an inwardly extending annular shoulder 238 (FIG. 4) which is closely fitted with the exterior of the body tube 228 in order to maintain the body tube and the end tubes 35a and 35b in coaxial relation. In this arrangement, each gland 48a or 48b comprises an annular backing member 240 and a plurality of chevronels 242, also of annular configuration. The confronting surface of the backing member 240 is provided with a relatively shallow V-groove 244 in order that the backing member can conform to the surface configuration of the adjacent chevronel. At the other side of the gland 48a or 48b, the stack of chevronels are engaged by a foremember 246 provided with a peaked configuration to conform likewise with the surface of the adjacent chevronel. The chevronels 242 are closely fitted into an annular space 248 formed between the adjacent wall portions of each end tube 35a or 35b and the body tube 228. However, the backing member 244 and the adjacent portion of the foremember 246 are spaced from the side walls of the annular cavity 248 in order to ensure proper seating between these members and the stack of chevronels 242.

In this arrangement, the fore and backing members are fabricated from a relatively hard metal such as zirconium, zirconium alloy, or stainless steel while the chevronels 242 are fabricated from a relatively softer metal such as aluminum. The chevronels 242 are loaded by means presently to be described so that the resulting compression forces the relatively softer metal of the chevronels into sealing relationship with the adjacent side walls of the body tube 228 and the end tube 35a or 35b.

Compressive force is applied to the foremember 246 in this arrangement by means of a pair of annular nuts 250 and 252 which cooperate as explained hereinafter to apply such force. To receive properly the force imparted by the nuts 250 and 252 and associated component presently to be explained, a foremember 246 is provided with an L-shaped cross-sectional configuration, of which the leg of the L is spaced from the annular offset 254 disposed adjacent the cavity 248 so that the foremember 246 can be forced into longitudinal movement relative to the stack of chevronels 242.

In this arrangement of the invention, the annular nut 250 is threaded to the adjacent end portion of the body tube 228 while the other annular nut 252 is threaded to the end tube 35a or 35b and positioned in bearing contact against the annular nut 250. However, the forces transmitted between the nuts 250 and 252 are relatively slight so that relative movement between the end tube 35a or 35b and the adjacent end of the body tube 228 is not induced. The nut 250 similarly is threaded into contact with the foremember 246, and some movement can be imparted thereto by virtue of clearance 256 formed between the confronting surface of the nut 250 and an offset 258 formed in the inner wall surface of the end tube 35a or 35b.

The main loading force applied to the packing gland 48a or 48b, however, is afforded by a plurality of set screws 260 which are threaded through tapped apertures extending longitudinally through the annular nut 250. Each of the set screws 260 is provided with a keyed configuration 262 adjacent the outward ends of the set screws so that the latter can be threaded into bearing contact with the foremember 246. In furtherance of this purpose, the inner diameter 264 of the annular nut 252 is placed beyond the points of tangency with the keyed configurations 262 so that a suitable tool can be inserted through the annular nut 252 for purposes of tightening the set screws 260. It is also contemplated that the keyed configurations 262, before tightening the set screws 260 into bearing contact with the foremember 246, can be employed with a suitably shaped spanner wrench for the purpose of threading the annular nut 250 into position. Similarly, the annular nut 252 is threaded into position by means of a spanner wrench shaped to cooperate with keyed recesses 266 of the annular nut 252. With this arrangement, the compressive loading force applied to the chevron gland 48a or 48b is applied between the annular shoulder 238 of the end tube 35a or 35b and the outer annular nut 252, which is threaded to the end tube. Therefore, no differential forces are applied between the body tube 228 and the end tube 35a and 35b secured thereto, as the inner annular nut 250 serves merely as a holder for the set screws 260 and is backed up by the outer annular nut 252 threaded as aforesaid to the end tube 35a or 35b. There is, therefore, no differential movement between the portions of the body tube 228 and of the end tube 35a or 35b forming the walls of the packing cavity 248, which would tend to impair the chevron seal.

The chevron packing glands 48a and 48b ensure that leaks will not occur between the coolant fluid passing through the pressure tubes 24 and the moderating fluid contained within the moderating tank 18 but outside of the pressure tubes 24. Therefore, differing fluids are employable for each purpose, for example, heavy water can be employed as the moderating fluid while light water can be pumped through the pressure tubes 24 for purposes of removing heat from the fuel elements 38 contained therein.

In this arrangement of the invention, the outward end of the end tube 35a or 35b, or the fuel loading or unloading port 206 (FIG. 4) or 206' (FIG. 5) is closed by a fuel tube closure or sealing member 45a or 45b respectively. The closure 45a or 45b is a relatively heavy annular member and is provided with a shallow groove 268 on the inner face thereof, at the outer edge of which groove is disposed a sealing O-ring 270. When the closure 45a or 45b is centered coaxially by means presently to be described and seated against the offset portion 272 formed within the end tube 35a or 35b adjacent the mouth thereof, the sealing O-ring 270 is compressed between the offset 272 and the adjacent bottom portion of the groove 268.

In accordance with the invention, the closure 45a or 45b is secured in place by means of a closure nut 46a or 46b, respectively, and associated components presently to be described, which closure is threaded into the mouth of the end tube 35a or 35b as denoted by reference numeral 274. However, before inserting the closure nut 46a or 46b and the associated closure into the mouth of the end tube 35a or 35b, the closure nut and closure and associated components are joined by means presently to be described so that these components can be removed as a unit by the aforedescribed manipulator assembly 34 in order to provide unimpeded access for inserting or withdrawing the fuel elements 38. One arrangement for so securing the closure and closure nut includes a pair of cooperating retaining rings 276 and 278 joined respectively to the closure nut and to the closure by means of an annular array of recessed cap crews 280 and 282. When thus positioned, the inner edge of the retaining ring 276 overlies the outer edge of the retaining ring 278 thereby preventing separability of the closure and closure nut. For ease of assembly, the cap screws 280 are accessible from the exterior of the end tube 35a or 35b, which also permits removal of the closure nut, if desired, without withdrawing the closure 45a or 45b and associated components.

Before assembling the retaining ring 276 to the closure 46a or 46b, however, a bearing ring 284 is similarly secured to the inner surface of the closure nut 46a or 46b whereby retaining and sealing force is transmitted to the associated closure. Alternatively, however, the bearing ring 284 can be fabricated integrally with the closure nut 46a or 46b, but in this case is made separate for ease of manufacture. In this arrangement, the retaining ring 276 is closely fitted over a projecting annular shoulder portion 286 of the closure 45a or 45b so that the latter is maintained in coaxial relation to its associated closure nut. As indicated previously, the closure nut 46a or 46b is provided with a keyed, configuration, in this example, a hexagonal one, for purposes of threading or unthreading the nut relative to the threaded mouth portion 274 of the end tube 35a or 35b, by means for example, of the manipulator 34.

Referring now particularly to FIG. 4 of the drawings, a control throttle designated generally by the reference character 288 is positioned within the fuel port 206 and joined primarily to the closure 45a for removal therewith in order to provide free access for insertion of a fuel element 38. In this arrangement of the invention, the throttle 288 comprises a pair of interfitting cylinders 41 and 42, the outermost one 41 of which desirably is shrunk-fitted upon a projecting angular shoulder portion 290 formed upon the confronting surface of the closure 45a. The other end of the cylinder 41 is slidably fitted into a chamfered and offset portion 292 formed in the adjacent end portion of a stabilizing tube 294. The stabilizing tube 294 is positioned coaxially of the end tube 35a by threading into the confronting end of the body tube 228 as denoted by reference numeral 296 and by slip-fitting into an offset portion of an annular ring 298, which is closely fitted into the end tube 35a. The space 300 between the end tube 35a and the throttle cylinder 41 forms a manifold for supplying coolant fluid to the throttle arrangement in the manner described below. Coolant is, in turn, conducted to the manifold 300 by means of an individual inlet head or pipe 40a. In this example, a plurality of flow apertures 302 are formed in the ring member 298 so that coolant can be provided if desired from another source through inlet conduit 304.

The inner throttle cylinder 42 is joined at its outward end to a rotatable actuating mechanism 306 positioned for rotary movement upon a raised portion 308 of the closure shoulder 290. The actuating mechanism 306 includes a stem 310 inserted through a central aperture 312 of the closure 45a and extending into the recess 210 of the closure nut 46a. A conventional packing gland 314 seals the passage of the stem 310 through the closure 45a, the packing of which gland is loaded in a conventional manner by means of an annular nut 316.

Rotation of the stem 310 is effected by the engagement of the stem 310 with an actuator plug 55. A sleeve portion 318 of the plug 55 is shrunk-fitted to the keyed end portion of the stem 310. The inward end of the sleeve 318 is closely fitted into an annular recess 320 of a threaded bushing 322 for rotary movement relative to the bushing. The bushing 322 is threaded into a tapped, widened portion of the closure aperture 312 and is provided with an O-ring 324 for secondary sealing purposes. End portion 326 of the actuator plug 55 is keyed for cooperation with the suitable tool (not shown) affixable to the manipulator assembly 34 for operation of the actuating mechanism 306, and in this example a cubic configuration is imparted to the end portion 326.

It will thus be seen that the outer throttle cylinder 41 is maintained in fixed position when the closure 45a is in operating position, while the inner throttle cylinder 42 is rotatable relative thereto. In this example, the inner cylinder is supported in cantilever fashion since the cylinder need not be perfectly coaxial, and the space between the cylinders 41 and 42 is provided chiefly to ensure freedom of rotation of the inner cylinder. If desired, the inner end 328 of the inner cylinder can be extended to engage lightly the chamfered portion 292 of the stabilizing tube 294 to ensure a coaxial relation between the throttle cylinders 41 and 42.

In this arrangement, each cylinder 41 or 42 is provided with two circumferential rows of apertures 43 and 44, respectively. Each row of apertures 43 or 44 contains individual apertures of varying sizes, which in this example become progressively larger in the clockwise direction about the circumference of the cylinders 41 and 42, as viewed from the outer end of the port tube 35a. By rotating the inner cylinder 42 relative to the fixed cylinder 41, various pairs of differing sizes of apertures 43 and 44 can be put into registry with the result that the flow of coolant through the pressure tube 24 in the direction indicated by arrow 39 is varied, as desired. Inasmuch as each of the pressure tubes 24, shown in FIGS. 1A to 3B of the drawings, is provided with throttle arrangement 288, the coolant flow velocities in selected ones or all of the tubes 24 can be varied for the purposes pointed out previously.

The relative sizes and dispositions of the apertures 43 and 44 can be made, within the contemplation of the invention, such that rotation of the inner cylinder 42 will give predetermined rates of flow of the coolant through the individual pressure tubes 24, with the result that the temperatures within the pressure tubes can be controlled individually. It will be appreciated that since each tube is provided with its own throttle 288, it is possible to control precisely the temperature of all the tubes in the reactor by individual adjustment of each tube, thereby establishing that temperature condition or distribution which is most efficient or most convenient for a given size of reactor and type of nuclear fuel material.

The aforementioned flow direction of the pressure tube coolant, as indicated by the arrow 39, is in the same direction as the fuel elements are fed through the pressure tubes when fueling or refueling the same, so that the force of flowing coolant tends to hold the fuel elements in a closely packed tandem relation against the fuel port closure 45b at the unloading end of the individual pressure tube 24. When thus arranged, the positions of the individual fuel elements 38 are shown by the partial fuel elements depicted in FIGS. 4 and 5 of the drawings. Inasmuch as it is contemplated that the pressure tubes 24 will be loaded and unloaded in a continuous cyclic manner, the positioned closeness of the individual fuel element 38 to the unloading port 206' determines the percentage depletion thereof. Thus, the endmost fuel element 38c of each pressure tube 24 is substantially fully depleted and is maintained in that part of the pressure tube protruding outwardly of the end shield tank 23b (FIG. 5), for the reason that the endmost element contributes little if any to the chain reaction sustained in the reactor core area.

As shown in FIG. 5, the end closure 45b for the fuel unloading port 206' (end tube 35b) is substantially similar to end closure 45a and is retained by an identical closure nut 46b. The closure 45b, however, differs from 45a in that the former is not provided with the inner projecting shoulder 290 and the central aperture 312. Instead, the inner surface of the closure 45b is provided with an annular recess 329 formed adjacent and inwardly of its shallow groove 268. When positioned as shown in FIG. 5, the closure 45b thus receives in its recess 329 the outward end of a fixed apertured sleeve 330. The sleeve 330 is threaded to the adjacent end of the body tube 228, as denoted by reference character 332, and the other end of the sleeve 330 is spaced from the adjacent walls of the end tube 35b by means of a uniform annulus 334. Accordingly, the apertured tube 330 is spaced substantially coaxially of the end tube 35b by the annulus 334 and by its threaded junction with the body tube 228. As a result, an annular manifolding space 336 is formed between the tube 330 and the end tube 35b, for the purpose described below.

The sleeve 330 is provided with a plurality of flow apertures 51 whereby coolant flowing into the associated end of the pressure tube 24, as denoted by flow arrow 338, is conducted to the manifolding space 336 and thence outwardly of the pressure tube 24 by means of outlet conduit 40b. An alternative position of the outlet conduit 40b is denoted by a phantom conduit 340 also communicating with the annular space 336. The alternate conduit 340 is employed in connection with certain of the pressure tubes 24 so that adequate space is afforded for the outlet conduits of all the pressure tubes 24. The same is true of alternate conduit 304 shown in FIG. 4.

In accordance with the invention, each pressure tube arrangement 24 is provided with a thermal insulating arrangement adjacent its body tube 228, which of course, is the hottest portion of the pressure tube 24. As pointed out previously, this insulation desirably is provided within the pressure tube 24, namely the body tube 228 thereof, so that the walls of the pressure tubes will operate at as cool a temperature as practical. Accordingly, less expensive alloys or other structural metals can be employed for fabricating the pressure tubes. The chief purpose of the thermal insulation, however, is to permit the moderating fluid of the reactor to operate at a lower and more efficient temperature.

In this arrangement of the invention, and referring once again to FIGS. 4 to 6 of the drawings, the insulating arrangement comprises a pair of spaced interfitting sleeves 49 and 50 which coextend with substantially the entire length of the body tube 228. Means are provided for maintaining the tubes 49 and 50 in spaced relation to one another and to the inner wall surface of the body tube 228 so that stagnant volumes of pressure tube coolant are maintained therebetween. These stagnant volumes, of course, induce a sharp temperature drop between the main volume of coolant flowing through the pressure tube as denoted by arrows 39 and 338 and body of moderating fluid surrounding the pressure tubes 24.

One arrangement for spacing and positioning the insulating sleeves 49 and 50 within the body tube 228 is shown in FIGS. 4, 5 and 13. Such means include a pair of annular members 342 and 344. Each annular member is formed with a pair of annular offsets 346 and 348 spaced coaxially of one another. The respective ends of the inner insulating sleeve 49 are inserted into the offsets 346 of the annular members 342 and 344, while the ends of the outer sleeve 50 are inserted into the offsets 348. The offsets 346 and 348 serve to maintain the sleeves 49 and 50 coaxially relative to one another and to the inner wall surface of the body tube 228. As better shown in FIG. 13, each of the sleeves 49 and 50 is provided with one or more pressure relieving apertures 350 or 352, which, however, are of insufficient size to disturb the stagnant character of the coolant maintained between the sleeves 49 and 50 and between the sleeve 50 and body tube 228. If desired, the coaxial relationship of the sleeves 49 and 50 and the tube 228 can be ensured throughout the length thereof by a plurality of protrusions 354 formed upon the outer surfaces of each of the sleeves 49 and 50.

When thus positioned by the annular members 342 and 344, the sleeves 49 and 50 and these members are positioned between chamfered offsets 356 and 358 formed respectively on the adjacent end portions of the stabilizing tube 294 and the apertured tube 330. When thus positioned, the breadth of the offset portions 346 and 348 of the annular members 342 and 344 are sufficient to provide thermally expansionable spaces 360 and 362 for the sleeves 49 and 50, without the latter becoming unseated from or engaging the ends of the offsets 346 and 348, respectively.

Referring now to FIGS. 7 to 9, each fuel element 38 comprises a pair of end plates 52 which are spaced apart and coupled together by a series of cladding tubes 53. Each tube 53 is terminated at its ends by respective plug members 54. The latter members are fitted into the respective end plates 52, with the plugs being secured by having been expanded into apertures 380 of the end plates 52, as denoted by reference character 382. In furtherance of this purpose, each of the plugs 54 is provided with an outwardly extending tubular section 384, which upon forceful insertion of a suitable tool, can be expanded outwardly against the frusto-conical section 386 of the associated aperture 380. For ease in manufacture, the plugs 54 can be formed integrally and the tubular projection 384 can be formed by boring the plug as denoted by reference character 388. Desirably, the cladding tubes 53 are hermetically sealed against the escape of fissionable products by welding to the plugs 54 inserted therein, as denoted by reference character 390.

Before assembling the cladding tubes 53 to their respective plugs 54, each cladding tube is substantially filled with a series of generally cylindrical pellets 392 of fissile material, which in this example includes natural or source grade uranium oxide having, of course, a fissionable isotope content of about 0.7% $U^{235}$. When thus filled, an expansionable space 394 is permitted to remain between one of the end plugs 54 and the adjacent fuel pellet 392 to accommodate the differences of the expansion between the cladding tubes 53 and much hotter pellets 392 during operation of the reactor.

Each end plate 52 additionally is provided with a series of apertures 56 to ensure adequate flow of the pressure tube coolant between the cladding tubes 53. A registering lug 396 is affixed to one end plate of each fuel element 38 to provide means for rotatively aligning successive fuel elements 38 so that their apertures 56 are in registry to minimize obstruction to the flow of the pressure tube coolant. As better shown in FIG. 8, the lug 396 occupies the position of one of the normally provided innermost circle of six apertures 56'. Accordingly, for ease in aligning the tandem series of fuel elements 38, there are six rotative positions at which the plug 396 can register with an aperture 56' of the opposing end plate 52 of an adjacent fuel element 38.

The reactor described above is intended to operate with the pressure tubes in the horizontal position for best results and is intended to be fueled with natural or enriched uranium, moderated with heavy water at temperatures of 100° to 200° F. with a heavy water or light water coolant operating at about 1500 p.s.i. and at an average temperature of approximately 550° F. flowing through the pressure tubes. The moderator is contained in the cylindrical tank with the horizontal pressure tubes passing axially through it, the coolant being delivered to and received from the pressure tubes by individual pipes joined to each end of each pressure tube. Heat transfer from the coolant in the tubes 24 to the moderator in the tank is limited by the above-described annuli of stagnant water inside the pressure tubes. Steam generating heat exchangers (not shown) are separated from the reactor by sufficient shielding to permit access to the steam generators and their associated circulating pumps (not shown) while the reactor is shut down. With the internal stagnant liquid insulation, the tubes 24 operate at temperatures nearer to the moderator temperature and their thickness can either be reduced or a softer structural material employed. If insulation were to be provided outside the tubes 24, then they would operate nearer the coolant temperatures and would, therefore, require a greater thickness necessitating an increase in fuel inventory as a result of the greater neutron absorption of the thicker material. Although the internal insulation may permit greater heat loss to the moderator, such increased loss is more than compensated for by the more compact core structure that is obtained.

In view of the lower temperature at which the tubes 24 operate, it is apparent that aluminum alloy tubes can be used, although presently a material of more desirable characteristics is that known by the trade-name Zircaloy, being an alloy of zirconium consisting of approximately 1.2% tin, .1% iron, .05% chromium, .05% nickel with the remainder zirconium. The greater strength of this material coupled with its low neutron capture gives very favorable characteristics as compared with other alloys known at the present time. Zircaloy, of course, is less desirable from an initial cost standpoint.

The internal stagnant liquid insulation arrangement places the pressure tubes 24 in direct contact with the moderator, and so the tubes are sealed as described above to the ends of the moderator tank, as defined by the end shield tanks 23a and 23b, in a way that will prevent escape of the very expensive heavy water moderator. Since the moderator tank operates at low temperatures (100° to 200° F.) and the pressure tubes at high temperatures (500° to 600° F.), care is required to avoid excessive thermal stresses and distortions; hence, the construction described above in which the high temperature body tubes 228 of the pressure tubes 24 are not attached directly to the end shield tanks, but instead are attached to the end tubes 35a and 35b and transition tubes 36a and 36b. The temperature gradient along the axis of these tubes can thus be limited to values which will introduce acceptable thermal stresses.

With reference to FIG. 10, an alternative closure and closure nut assembly is illustrated for use with a modified end tube 35', the outer end of which is provided with a threaded configuration 398 as is the case of the end tubes 35a and 35b of FIGS. 4 and 5. In this arrangement, closure nut 400 is of cup-shaped configuration and is provided with a keying space 402 as in the case of the closure nut 46a or 46b. A bottom wall of the closure nut 400 is provided with a central aperture 404 for purposes explained below and an outer flange portion 406 is threaded exteriorly for cooperation with the threaded portion 398 of the end tube 35'.

Adjacent the flange 406 and on the inner surface of the closure nut 400, an annular recess 408 is formed for the reception of the outer rim 410 of a cup-shaped piston 63. A threaded stud 58 is joined to the piston 63 and is inserted through the central aperture 404 of the closure nut 400 to which the piston 63 is joined by means of nut 62.

A first echelon sealing arrangement is provided between the piston 63 and the inner wall surfaces of the end tube 35' by a series of, in this example, three piston rings 59. The piston rings 59 are conventional in nature and thus are seated into appropriate grooves 412 provided respectively therefor. A further piston ring 60, seated in a groove 414 therefor, operates to seal the rim 410 of the piston 63 to the closure nut 400.

Disposed between the ring 60 and the outermost one of the piston rings 59 is a packing gland denoted generally by the reference character 416. The gland 416 includes a wedge-shaped sealing member 61 formed from a relatively softer metal such as aluminum or one of its alloys, and a pair of backing members 418 and 420. The end tube 35' in this arrangement is provided with a frusto-conical section 422 adjacent the sealing member 61 for conformance therewith. By tightening the nut 62 on the threaded stud 58, the piston 63 is drawn toward the closure nut 400 so that the sealing member 61 is longitudinally compressed into sealing engagement with the aforementioned frusto-conical section 422 and the adjacent outer wall surface of the piston rim 410. This pressure is applied by the backing members 418 and 420 which are seated respectively against the closure nut flange 406 and the outermost one of the piston rings 59. The resultant sealing forces exerted by the sealing member 61 are still further increased by application of the internal pressure of the pressure tube 24' to the internal surface 424 of the piston 63 as denoted by arrows 426.

Returning now to FIGS. 4 to 6, the individual coolant conduits 40a and 40b to and from each pressure tube 24 have the advantage that coolant to any individual pressure tube can be cut off by stop valves or freeze plugs 428, some of which are shown in FIG. 3B, coupled in each of the conduits 40a and 40b. The valves or freeze plugs 428 are used to permit replacement of an entire pressure tube 24 and associated components without interrupting the flow of coolant to fuel elements 38 which are allowed to remain in the adjacent pressure tubes. Moreover, the individual coolant conduits 40a and 40b permit the flow of coolant in opposite directions in adjacent pressure tubes 24, by appropriate connection to suitably placed manifolding arrangements. As the direction of fueling is also in opposite directions in adjacent pressure tubes 24, when employing the fueling machine 16a and 16b (FIGS. 1A and 1B, respectively), the direction of flow can be utilized to maintain the fuel elements 38 (FIG. 7) in tandem contact with one another and to urge the elements toward the unloading end 206' of each pressure tube 24. Individual outlet conduits 40b can be provided with a relatively simple means of measuring the outlet coolant temperature from each pressure tube 24 and of obtaining a sample of coolant fluid from each pressure tube. Sample lines and valves (not shown) can also be provided for determining the location of faulty fuel elements 38 after an indication of failure in a fuel port tube 35b from a radiation monitor (not shown) located on the outlet conduit 40b.

Because the fuel loading and unloading ports 206 and 206' must be unobstructed to permit addition and removal of fuel elements 38, the inlet and outlet conduits 40a and 40b are passed between the end tubes 35a and 35b as better shown in FIG. 3B of the drawings. Thus, the conduits 40a and 40b are separated from each fueling pit 140 and 142 (FIGS. 1A and 1B respectively) by means of the aforedescribed sheet members 364 and 366 respectively. To provide adequate space for all of the necessary conduits 40a and 40b, a square lattice arrangement of the pressure tubes 24 is desirable as shown in FIG. 3A.

Horizontal fuel channels are particularly suitable for a pressure tube reactor which employs a cross-feed fueling principle as described, since cross-feed fueling requires access to both ends of the pressure tubes, which is not difficult if the tubes are horizontal. Although the horizontal pressure tubes are deflected slightly but uniformly, by the weight of the fuel, the fuel elements themselves are not subjected to column or longitudinal loading; and the cladding tubes of the fuel elements can, therefore, be made of relatively thin material, thus reducing the total amount of metal in the reactor core and increasing its efficiency. It is possible that the sliding of the fuel elements 38 in the horizontal pressure tubes 24 during refueling will damage the bore of the tube by abrasion, but in that case only the inner insulating sleeve 49 need be replaced instead of the entire pressure tube 24. Since the inner sleeve 49 is relatively thin-walled, a considerable saving in replacement costs results if this effect should occur.

As described above, the fueling equipment operates at both ends of each pressure tube simultaneously so that one fuel machine 16a (FIG. 1A) or 16b (FIG. 1B) charges a new fuel element 38 into one port 206 of the pressure tube 24 while a substantially depleted element is discharged from the other port 206' of this tube into the other fueling machine. As the fueling machines 16a and 16b and the transporters 29a and 29b (FIGS. 1A and 1B respectively) operate inside the concrete shielding for the reactor and are immediately adjacent to the reactor core, all operational indications therefrom and controls therefor are performed by known forms of instrumentation and equipment remotely operated from a location outside of the reactor shielding.

While only specific apparatus has been described, it will be evident to one skilled in the art that numerous variations may be made within the scope of this invention. For example, the materials suggested and the physical arrangements of components of the reactor can be varied in accordance with conditions as long as they fulfill the recognized requirements. It is additionally to be understood that certain features of the invention can be employed without a corresponding use of other features thereof.

Accordingly, what is claimed as new is:

1. In a nuclear reactor the combination comprising an elongated moderator tank, a pair of shielding tanks, said shielding tanks being joined to and closing the ends respectively of said moderator tank, a plurality of pressure tubes extending through said moderator tank and having their end portions passing through and secured to said shielding tanks for suspension thereby within said moderator tank, means for sealing the passage of said tubes through said shielding tanks, a quantity of fissile material located within said pressure tubes, and means for circulating a coolant medium through said tubes to remove heat developed in said fissile material.

2. In a nuclear reactor the combination comprising an elongated moderator tank, a pair of shielding tanks, said shielding tanks being joined to and closing the ends respectively of said moderator tank, a plurality of pressure tubes passing through said shielding tanks and being suspended thereby within said moderator tank, a quantity of fissile material located within said pressure tubes, means for circulating a coolant medium through said tubes to remove heat developed in said fissile material, each of said pressure tubes including a body tube extending substantially the distance between said end shield tanks and a pair of end tubes, the ends of said body tube being secured respectively to said end tubes at points removed from the ends of the latter, the end tubes of each pressure tube being sealably joined to said shielding tanks respectively at points adjacent their ends and the junctions between said shield tanks and said end tubes being spaced outwardly from the adjacent portions of said body tube to form a thermal insulating space between the adjacent portion of each body tube and said shield tanks so that the outer surface of said body tube is thermally insulated from components of said shielding tanks.

3. In a neutronic reactor the combination comprising an elongated moderator tank, a pair of shielding tanks, said tanks being jointed to and closing the ends respectively of said moderator tank, said shielding tanks each comprising a pair of spaced plates having a plurality of pairs of aligned apertures therein, a plurality of pressure tubes having their end portions passing through a pair of apertures of each shielding tank respectively, means for spacing said end portions from said plates to form an insulating space between said end portions and said plates, means for joining and sealing said spacing means to each plate of the respective shielding tank to enclose a shielding space therein, a quantity of fissile material located in said pressure tubes, and means for circulating a coolant medium through said pressure tubes to remove heat generated in said fissile material.

4. In a neutronic reactor the combination comprising an elongated moderator tank, a pair of shielding tanks, said shielding tanks being joined to and closing the ends respectively of said moderator tank, a plurality of pressure tubes extending through said moderator tank and having their end portions passing through and secured to said shielding tanks respectively for suspension thereby within said moderator tank, means for sealing the passage of said tubes through said shielding tanks, a plurality of fissile fuel elements located in tandem within each of said pressure tubes, each of said pressure tubes having at least one end thereof extending outwardly of the associated shielding tank for a distance substantially equivalent to the length of one of said fuel elements, and means for circulating a coolant medium through said tubes to remove heat developed in said fissile elements.

5. In a neutronic reactor the combination comprising an elongated moderator tank, a pair of shielding tanks, said shielding tanks being joined to and closing the ends respectively of said moderator tank, a plurality of pressure tubes extending through said moderator tank and having their end portions passing through and secured to said shielding tubes respectively for suspension thereby within said moderator tank, means for sealing the passage of said tubes through said shielding tanks, a plurality of fissile fuel elements located in tandem within each of said pressure tubes, the opposite ends respectively of adjacent pressure tubes extending outwardly of the associated shielding tanks for a distance substantially equivalent to the length of one of said fuel elements, means for unloading fuel elements at said opposite ends respectively and for loading said fuel elements at the other ends of adjacent fuel elements respectively, and means for circulating a coolant medium through said tubes to remove heat developed in said fissile elements.

6. In a neutronic reactor the combination comprising an elongated moderator tank, a pair of shielding tanks, said shielding tanks being joined to and closing the ends respectively of said moderator tank, a plurality of pressure tubes extending through said moderator tank and having their end portions passing through and secured to said shielding tubes respectively for suspension thereby within said moderator tank, means for sealing the passage of said tubes through said shielding tanks, a plurality of fissile fuel elements located in tandem within each of said pressure tubes, the opposite ends respectively of adjacent pressure tubes extending outwardly of the associated shielding tanks for a distance substantially equivalent to the length of one of said fuel elements, means for unloading fuel elements at said opposite ends respectively and for loading said fuel elements at the other ends of said adjacent pressure tubes respectively, and means for circulating a coolant medium in opposite directions through said adjacent tubes to remove heat developed in said fissile elements and to urge said fissile elements toward the unloading ends of said adjacent tubes.

7. In a neutronic reactor the combination comprising an elongated moderator tank, a pair of shielding tanks, said shielding tanks being joined to and closing the ends respectively of said moderator tank, a plurality of pressure tubes, each of said pressure tubes including a body tube fabricated from a material having a relatively low neutronic capture cross-section and a pair of end tubes joined respectively to the ends of said body tube, said shielding tanks each comprising a pair of spaced plates having a plurality of pairs of aligned apertures therein, said pressure tubes having their end tubes passing through a pair of apertures of each shielding tank respectively, means for spacing said end tubes from said plates to form an insulating space between said end tubes and said plates, means for joining and sealing said spacing means to each plate of the respective shielding tank to enclose a shielding space therein, a plurality of fissile fuel elements located in tandem within each of said pressure tubes, the opposite end tubes respectively of adjacent pressure tubes extending outwardly of the associated shielding tanks for a distance substantially equivalent to the length of one of said fuel elements, means for unloading fuel elements at said opposite ends respectively and for loading said fuel elements at the other ends of adjacent fuel elements respectively, means for circulating a cooling medium through said tubes to remove heat developed in said fissile elements, a plurality of radial reinforcing ribs secured to the outer surface of said moderator tank and extending outwardly therefrom, said ribs being spaced along the length of said moderator tank to reinforce the latter, and a generally tubular reflecting and shielding tank surrounding said moderator tank, said reflecting and shielding tank being joined and sealed adjacent its ends to the outermost ones of said ribs respectively, and said outermost ribs being joined and sealed to the outer surface of said moderator tank to enclose a reflecting and shielding space between said moderator tank and said reflecting and shielding tank.

References Cited by the Examiner

UNITED STATES PATENTS

| | | | |
|---|---|---|---|
| 2,744,064 | 5/56 | Moore | 176—61 |
| 2,848,404 | 8/58 | Treshow | 176—44 |
| 2,910,418 | 10/59 | Creutz et al. | 176—64 |

OTHER REFERENCES

AEC Document DR–39, Dec. 10, 1956.

CARL D. QUARFORTH, *Primary Examiner.*

ROGER L. CAMPBELL, *Examiner.*